US011968182B2

(12) United States Patent
Pandurangan

(10) Patent No.: US 11,968,182 B2
(45) Date of Patent: Apr. 23, 2024

(54) AUTHENTICATION OF SOFTWARE ROBOTS WITH GATEWAY PROXY FOR ACCESS TO CLOUD-BASED SERVICES

(71) Applicant: Automation Anywhere, Inc., San Jose, CA (US)

(72) Inventor: Senthil Pandurangan, Cupertino, CA (US)

(73) Assignee: Automation Anywhere, Inc., San Jose, CA (US)

( * ) Notice: Subject to any disclaimer, the term of this patent is extended or adjusted under 35 U.S.C. 154(b) by 192 days.

(21) Appl. No.: 17/389,318

(22) Filed: Jul. 29, 2021

(65) Prior Publication Data

US 2023/0032814 A1    Feb. 2, 2023

(51) Int. Cl.
*H04L 29/06* (2006.01)
*H04L 9/40* (2022.01)

(52) U.S. Cl.
CPC ...... *H04L 63/0281* (2013.01); *H04L 63/0853* (2013.01); *H04L 63/108* (2013.01)

(58) Field of Classification Search
CPC ............. H04L 63/0281; H04L 63/0853; H04L 63/108; H04L 63/0807
See application file for complete search history.

(56) References Cited

U.S. PATENT DOCUMENTS

| 5,949,999 A | 9/1999 | Song et al. |
| 5,983,001 A | 11/1999 | Boughner et al. |
| 6,133,917 A | 10/2000 | Feigner et al. |
| 6,226,407 B1 | 5/2001 | Zabih et al. |
| 6,389,592 B1 | 5/2002 | Ayres et al. |
| 6,427,234 B1 | 5/2002 | Chambers et al. |
| 6,473,794 B1 | 10/2002 | Guheen et al. |
| 6,496,979 B1 | 12/2002 | Chen et al. |

(Continued)

FOREIGN PATENT DOCUMENTS

| CN | 113268336 A | * | 8/2021 |
| WO | 2019/092672 A2 | | 5/2019 |
| WO | 2022/076488 | | 4/2022 |

OTHER PUBLICATIONS

Al Salami, Load Balancing in Green Cloud Computation, Proceedings of the World Congress on Engineering 2013 vol. II, WCE 2013, 2013, pp. 1-5 (Year: 2013).

(Continued)

*Primary Examiner* — Benjamin E Lanier

(57) ABSTRACT

Improved techniques for secure access to cloud-based services via a gateway proxy. The improved techniques can efficiently manage remote access to cloud-based services by local processing agents in a secure manner using an intermediate authentication token issued by a gateway proxy to authorized local processing agents. The intermediate authentication token can be used to obtain authentication credentials of service providers that are needed to access the cloud-based services that are offered by service providers. In some embodiments, the authentication credentials of service providers need only be distributed to the gateway proxy and need not be distributed beyond the gateway proxy. The improved techniques are well suited for used with robotic process automation systems in which local processing agents, such as software agents, perform user tasks in an automated fashion.

24 Claims, 12 Drawing Sheets

(56) References Cited

U.S. PATENT DOCUMENTS

| | | | |
|---|---|---|---|
| 6,640,244 B1 | 10/2003 | Bowman-Amuah | |
| 6,704,873 B1 | 3/2004 | Underwood | |
| 6,898,764 B2 | 5/2005 | Kemp | |
| 6,954,747 B1 | 10/2005 | Wang et al. | |
| 6,957,186 B1 | 10/2005 | Guheen et al. | |
| 7,091,898 B2 | 8/2006 | Arling et al. | |
| 7,246,128 B2 | 7/2007 | Jordahl | |
| 7,398,469 B2 | 7/2008 | Kisamore et al. | |
| 7,441,007 B1 | 10/2008 | Kirkpatrick et al. | |
| 7,533,096 B2 | 5/2009 | Rice et al. | |
| 7,568,109 B2 | 7/2009 | Powell et al. | |
| 7,571,427 B2 | 8/2009 | Wang et al. | |
| 7,765,525 B1 | 7/2010 | Davidson et al. | |
| 7,805,317 B2 | 9/2010 | Khan et al. | |
| 7,805,710 B2 | 9/2010 | North | |
| 7,810,070 B2 | 10/2010 | Nasuti et al. | |
| 7,846,023 B2 | 12/2010 | Evans et al. | |
| 8,028,269 B2 | 9/2011 | Bhatia et al. | |
| 8,056,092 B2 | 11/2011 | Allen et al. | |
| 8,095,910 B2 | 1/2012 | Nathan et al. | |
| 8,132,156 B2 | 3/2012 | Malcolm | |
| 8,209,738 B2 | 6/2012 | Nicol et al. | |
| 8,234,622 B2 | 7/2012 | Meijer et al. | |
| 8,245,215 B2 | 8/2012 | Extra | |
| 8,352,464 B2 | 1/2013 | Fotev | |
| 8,365,147 B2 | 1/2013 | Grechanik | |
| 8,396,890 B2 | 3/2013 | Lim | |
| 8,438,558 B1 | 5/2013 | Adams | |
| 8,443,291 B2 | 5/2013 | Ku et al. | |
| 8,464,240 B2 | 6/2013 | Fritsch et al. | |
| 8,498,473 B2 | 7/2013 | Chong et al. | |
| 8,504,803 B2 | 8/2013 | Shukla | |
| 8,631,458 B1 | 1/2014 | Banerjee | |
| 8,682,083 B2 | 3/2014 | Kumar et al. | |
| 8,713,003 B2 | 4/2014 | Fotev | |
| 8,724,907 B1 | 5/2014 | Sampson et al. | |
| 8,769,482 B2 | 7/2014 | Batey et al. | |
| 8,819,241 B1 | 8/2014 | Washbum | |
| 8,832,048 B2 | 9/2014 | Lim | |
| 8,874,685 B1 | 10/2014 | Hollis et al. | |
| 8,943,493 B2 | 1/2015 | Schneider | |
| 8,965,905 B2 | 2/2015 | Ashmore et al. | |
| 8,966,458 B2 | 2/2015 | Asai | |
| 9,032,314 B2 | 5/2015 | Mital et al. | |
| 9,104,294 B2 | 8/2015 | Forstall et al. | |
| 9,171,359 B1 | 10/2015 | Lund | |
| 9,213,625 B1 | 12/2015 | Schrage | |
| 9,251,413 B2 | 2/2016 | Meler | |
| 9,278,284 B2 | 3/2016 | Ruppert et al. | |
| 9,444,844 B2 | 9/2016 | Edery et al. | |
| 9,462,042 B2 | 10/2016 | Shukla et al. | |
| 9,571,332 B2 | 2/2017 | Subramaniam et al. | |
| 9,600,519 B2 | 3/2017 | Schoning et al. | |
| 9,621,584 B1 | 4/2017 | Schmidt et al. | |
| 9,946,233 B2 | 4/2018 | Brun et al. | |
| 9,965,139 B2 | 5/2018 | Nychis | |
| 9,990,347 B2 | 6/2018 | Raskovic et al. | |
| 10,015,503 B1 | 7/2018 | Ahammad | |
| 10,043,255 B1 | 8/2018 | Pathapati et al. | |
| 10,122,707 B2 * | 11/2018 | Fork | H04L 63/0807 |
| 10,282,280 B1 | 5/2019 | Gouskova | |
| 10,454,921 B1 * | 10/2019 | Chen | H04L 63/0428 |
| 10,489,682 B1 | 11/2019 | Kumar et al. | |
| 10,654,166 B1 | 5/2020 | Hall | |
| 10,706,218 B2 | 7/2020 | Milward et al. | |
| 10,706,228 B2 | 7/2020 | Buisson | |
| 11,176,443 B1 | 11/2021 | Selva | |
| 11,182,178 B1 | 11/2021 | Singh et al. | |
| 11,182,604 B1 | 11/2021 | Methaniya | |
| 11,243,803 B2 | 2/2022 | Anand et al. | |
| 11,310,034 B2 * | 4/2022 | Huang | H04L 63/08 |
| 11,348,353 B2 | 5/2022 | Sundell et al. | |
| 11,614,731 B2 | 3/2023 | Anand et al. | |
| 2002/0029232 A1 | 3/2002 | Bobrow et al. | |
| 2003/0033590 A1 | 2/2003 | Leherbauer | |
| 2003/0101245 A1 | 5/2003 | Srinivasan et al. | |
| 2003/0114959 A1 | 6/2003 | Sakamoto | |
| 2003/0159089 A1 | 8/2003 | DiJoseph | |
| 2004/0083472 A1 | 4/2004 | Rao et al. | |
| 2004/0153649 A1 | 8/2004 | Rhoads | |
| 2004/0172526 A1 | 9/2004 | Tann et al. | |
| 2004/0210885 A1 | 10/2004 | Wang et al. | |
| 2004/0243994 A1 | 12/2004 | Nasu | |
| 2005/0188357 A1 | 8/2005 | Derks et al. | |
| 2005/0204343 A1 | 9/2005 | Kisamore et al. | |
| 2005/0257214 A1 | 11/2005 | Moshir et al. | |
| 2006/0095276 A1 | 5/2006 | Axelrod et al. | |
| 2006/0150188 A1 | 7/2006 | Roman et al. | |
| 2006/0218110 A1 | 9/2006 | Simske et al. | |
| 2007/0030528 A1 | 2/2007 | Quaeler et al. | |
| 2007/0089101 A1 | 4/2007 | Romanovskiy | |
| 2007/0101291 A1 | 5/2007 | Forstall et al. | |
| 2007/0112574 A1 | 5/2007 | Greene | |
| 2007/0156677 A1 | 7/2007 | Szabo | |
| 2008/0005086 A1 | 1/2008 | Moore | |
| 2008/0027769 A1 | 1/2008 | Eder | |
| 2008/0028392 A1 | 1/2008 | Chen et al. | |
| 2008/0133052 A1 | 6/2008 | Jones | |
| 2008/0209392 A1 | 8/2008 | Able et al. | |
| 2008/0222454 A1 | 9/2008 | Kelso | |
| 2008/0263024 A1 | 10/2008 | Landschaft et al. | |
| 2009/0037509 A1 | 2/2009 | Parekh et al. | |
| 2009/0103769 A1 | 4/2009 | Milov et al. | |
| 2009/0116071 A1 | 5/2009 | Mantell | |
| 2009/0172814 A1 | 7/2009 | Khosravi et al. | |
| 2009/0199160 A1 | 8/2009 | Vaitheeswaran et al. | |
| 2009/0217309 A1 | 8/2009 | Grechanik et al. | |
| 2009/0249297 A1 | 10/2009 | Doshi et al. | |
| 2009/0313229 A1 | 12/2009 | Fellenstein et al. | |
| 2009/0320002 A1 | 12/2009 | Peri-Glass et al. | |
| 2010/0023602 A1 | 1/2010 | Martone | |
| 2010/0023933 A1 | 1/2010 | Bryant et al. | |
| 2010/0100605 A1 | 4/2010 | Allen et al. | |
| 2010/0106671 A1 | 4/2010 | Li et al. | |
| 2010/0138015 A1 | 6/2010 | Colombo et al. | |
| 2010/0235433 A1 | 9/2010 | Ansari et al. | |
| 2010/0251163 A1 | 9/2010 | Keable | |
| 2011/0022578 A1 | 1/2011 | Fotev | |
| 2011/0106284 A1 | 5/2011 | Catoen | |
| 2011/0145807 A1 | 6/2011 | Molinie et al. | |
| 2011/0197121 A1 | 8/2011 | Kletter | |
| 2011/0267490 A1 | 11/2011 | Goktekin | |
| 2011/0276568 A1 | 11/2011 | Fotev | |
| 2011/0276946 A1 | 11/2011 | Pletter | |
| 2011/0302570 A1 | 12/2011 | Kurimilla et al. | |
| 2012/0011458 A1 | 1/2012 | Xia et al. | |
| 2012/0042281 A1 | 2/2012 | Green | |
| 2012/0124062 A1 | 5/2012 | Macbeth et al. | |
| 2012/0131456 A1 | 5/2012 | Lin et al. | |
| 2012/0143941 A1 | 6/2012 | Kim | |
| 2012/0210415 A1 * | 8/2012 | Somani | H04L 67/1008 726/9 |
| 2012/0324333 A1 | 12/2012 | Lehavi | |
| 2012/0330940 A1 | 12/2012 | Caire et al. | |
| 2013/0173648 A1 | 7/2013 | Tan et al. | |
| 2013/0227535 A1 | 8/2013 | Kannan | |
| 2013/0236111 A1 | 9/2013 | Pintsov | |
| 2013/0290318 A1 | 10/2013 | Shapira et al. | |
| 2014/0036290 A1 | 2/2014 | Miyagawa | |
| 2014/0045484 A1 | 2/2014 | Kim et al. | |
| 2014/0181705 A1 | 6/2014 | Hey et al. | |
| 2014/0189576 A1 | 7/2014 | Carmi | |
| 2014/0379666 A1 | 12/2014 | Bryon | |
| 2015/0082280 A1 | 3/2015 | Betak et al. | |
| 2015/0235193 A1 | 8/2015 | Cummings | |
| 2015/0310268 A1 | 10/2015 | He | |
| 2015/0347284 A1 | 12/2015 | Hey et al. | |
| 2016/0019049 A1 | 1/2016 | Kakhandiki et al. | |
| 2016/0034441 A1 | 2/2016 | Nguyen et al. | |
| 2016/0044124 A1 * | 2/2016 | Sarukkai | H04L 43/0876 709/224 |
| 2016/0055376 A1 | 2/2016 | Koduru | |
| 2016/0078368 A1 | 3/2016 | Kakhandiki et al. | |
| 2017/0270431 A1 | 9/2017 | Hosabettu | |

(56) References Cited

U.S. PATENT DOCUMENTS

| | | |
|---|---|---|
| 2018/0113781 A1 | 4/2018 | Kim |
| 2018/0218429 A1 | 8/2018 | Guo et al. |
| 2018/0275835 A1 | 9/2018 | Prag |
| 2018/0276462 A1 | 9/2018 | Davis |
| 2018/0321955 A1 | 11/2018 | Liu |
| 2018/0370029 A1 | 12/2018 | Hall |
| 2019/0005050 A1 | 1/2019 | Proux |
| 2019/0026215 A1 | 1/2019 | Agarwal |
| 2019/0028587 A1 | 1/2019 | Unitt |
| 2019/0034041 A1 | 1/2019 | Nychis |
| 2019/0114370 A1 | 4/2019 | Cerino |
| 2019/0126463 A1 | 5/2019 | Purushothaman |
| 2019/0141596 A1 | 5/2019 | Gay |
| 2019/0188462 A1 | 6/2019 | Nishida |
| 2019/0213822 A1 | 7/2019 | Jain |
| 2019/0266692 A1 | 8/2019 | Stach et al. |
| 2019/0317803 A1 | 10/2019 | Maheshwari |
| 2019/0324781 A1 | 10/2019 | Ramamurthy |
| 2019/0340240 A1 | 11/2019 | Duta |
| 2019/0377987 A1 | 12/2019 | Price et al. |
| 2020/0019767 A1 | 1/2020 | Porter et al. |
| 2020/0034976 A1 | 1/2020 | Stone et al. |
| 2020/0059441 A1 | 2/2020 | Viet |
| 2020/0097742 A1 | 3/2020 | Kumar et al. |
| 2020/0104350 A1 | 4/2020 | Allen |
| 2020/0147791 A1 | 5/2020 | Safary |
| 2020/0151444 A1 | 5/2020 | Price et al. |
| 2020/0151591 A1 | 5/2020 | Li |
| 2020/0249964 A1 | 8/2020 | Fernandes |
| 2020/0285353 A1 | 9/2020 | Rezazadeh Sereshkeh |
| 2020/0311210 A1 | 10/2020 | Nama |
| 2020/0334249 A1 | 10/2020 | Canim |
| 2021/0107140 A1 | 4/2021 | Singh |
| 2021/0279166 A1 | 9/2021 | Peng |
| 2022/0245936 A1 | 8/2022 | Valk |
| 2022/0405094 A1 | 12/2022 | Farquhar |
| 2023/0052190 A1 | 2/2023 | Goyal et al. |
| 2023/0053260 A1 | 2/2023 | Goyal et al. |

OTHER PUBLICATIONS

B.P. Kasper "Remote: A Means of Remotely Controlling and Storing Data from a HAL Quadrupole Gass Analyzer Using an IBM-PC Compatible Computer", Nov. 15, 1995, Space and Environment Technology Center.
Bergen et al., RPC automation: making legacy code releant, May 2013, 6 pages.
Hu et al., Automating GUI testing for Android applications, May 2011, 7 pages.
Konstantinou et al., An architecture for virtual solution composition and deployment in infrastructure clouds, 9 pages (Year: 2009).
Nyulas et al., An Ontology-Driven Framework for Deploying JADE Agent Systems, 5 pages (Year: 2006).
Tom Yeh, Tsung-Hsiang Chang, and Robert C. Miller, Sikuli: Using GUI Screenshots for Search and Automation, Oct. 4-7, 2009, 10 pages.
Yu et al., Deplying and managing Web services: issues, solutions, and directions, 36 pages (Year: 2008).
Zhifang et al., Test automation on moble device, May 2010, 7 pages.
Non-Final Office Action for U.S. Appl. No. 17/230,492, dated Oct. 14, 2022.
Notice of Allowance for U.S. Appl. No. 16/398,532, dated Oct. 23, 2022.
Non-Final Office Action for U.S. Appl. No. 16/876,530, dated Sep. 29, 2020.
Final Office Action for U.S. Appl. No. 16/876,530, dated Apr. 13, 2021.
Notice of Allowance for U.S. Appl. No. 16/876,530, dated Jul. 22, 2021.
Dai, Jifeng et al., "R-fcn: Object detectiom via region-based fully convolutional networks", Advances in neural information processing systems 29 (2016). (Year: 2016).
Ren, Shaoqing et al., "Faster r-cnn: Towards real0time object detection with region proposal network." Advances in neutral information processing systems 28 (2015). (Year: 2015).
Zhifang et al., Test automation on mobile device, May 2010, 7 pages.
International Search Report for PCT/US2021/053669, dated May 11, 2022.
Embley et al., "Table-processing paradigms: a research survey", International Journal on Document Analysis and Recognition, vol. 8, No. 2-3, May 9, 2006, pp. 66-86.
Non-Final Office Action for U.S. Appl. No. 16/925,956, dated Sep. 16, 2021.
Notice of Allowance for U.S. Appl. No. 16/925,956, dated Jan. 7, 2022.
Pre-Interview Office Action for U.S. Appl. No. 16/398,532, dated Jul. 8, 2022.
Notice of Allowance for U.S. Appl. No. 16/398,532, dated Oct. 13, 2022.
Non-Final Office Action for U.S. Appl. No. 17/139,838, dated Feb. 22, 2022.
Final Office Action for U.S. Appl. No. 17/139,838, dated Nov. 15, 2022.
Notice of Allowance for U.S. Appl. No. 17/139,838, dated Apr. 5, 2023.
International Search Report and Written Opinion for PCT/US2021/015691, dated May 11, 2021.
A density-based algorithm for discovering clusters in large spatial databases with noise, Ester, Martin; Kriegel, Hans-Peter; Sander, Jorg; Xu, Xiaowei, Simoudis, Evangelos; Han, Jiawei; Fayyad, Usama M., eds., Proceedings of the Second International Conference on Knowledge Discovery and Data Mining (KDD-96). AMI Press. pp. 226-231 (1996).
Deep Residual Learning for Image Recognition, by K. He, X. Zhang, S. Ren, and J. Sun, arXiv:1512.03385 (2015).
FaceNet: A Unified Embedding for Face Recognition and Clustering, by F. Schroff, D. Kalenichenko, J. Philbin, arXiv:1503.03832 (2015).
Muhammad et al. "Fuzzy multilevel graph embedding", copyright 2012 Elsevier Ltd.
Sharma et al. Determining similarity in histological images using graph-theoretic description and matching methods for content-based image retrieval in medical diagnostics, Biomed Center, copyright 2012.
First Action Interview Pilot Program Pre-Interview communication for U.S. Appl. No. 16/779,462, dated Dec. 3, 2021.
Reply under 37 CDT 1.111 to Pre-Interview Communication for U.S. Appl. No. 16/779,462, filed Jan. 25, 2022.
Notice of Allowance for U.S. Appl. No. 16/779,462 dated Feb. 9, 2022.
Notice of Allowance for U.S. Appl. No. 17/131,674, dated Jun. 22, 2023.
Non-Final Office Action for U.S. Appl. No. 16/731,044, dated Jan. 25, 2021.
Notice of Allowance for U.S. Appl. No. 16/731,044, dated May 5, 2021.
Non-Final Office Action for U.S. Appl. No. 18/126,935, dated Jul. 13, 2023.
Non-Final Office Action for U.S. Appl. No. 17/139,842, dated Jul. 18, 2023.
Notice of Allowance for U.S. Appl. No. 17/588,588, dated Aug. 2, 2023.
Pre-Interview Office Action for U.S. Appl. No. 16/859,488, dated Jan. 25, 2021.
First Action Interview for U.S. Appl. No. 16/859,488, dated Mar. 22, 2021.
Final Office Action for U.S. Appl. No. 16/859,488, dated Jul. 8, 2021.
Notice of Allowance for U.S. Appl. No. 16/859,488, dated Mar. 30, 2022.
Non-Final Office Action for U.S. Appl. No. 17/160,084, dated Aug. 10, 2023.

\* cited by examiner

AUTHENTICATION OF SOFTWARE ROBOTS WITH GATEWAY PROXY FOR ACCESS TO CLOUD-BASED SERVICES

BACKGROUND OF THE INVENTION

Robotic Process Automation (RPA) systems enable automation of repetitive and manually intensive computer-based tasks. In an RPA system, computer software, namely a software robot (often referred to as a "bot"), may mimic the actions of a human being in order to perform various computer-based tasks. For instance, an RPA system can be used to interact with one or more software applications through user interfaces, as a human being would do. Therefore, RPA systems typically do not need to be integrated with existing software applications at a programming level, thereby eliminating the difficulties inherent to integration. Advantageously, RPA systems permit the automation of application level repetitive tasks via software robots that are coded to repeatedly and accurately perform the repetitive tasks.

In some cases, software robots desire to access cloud-based services offered by remote service providers. However, since such access is normally over public networks, often a requestor must have access credentials in order to gain access to the cloud-based services. Unfortunately, since software robots operate from user's computers, the software robots are numerous and highly distributed. As such, it is complicated and less secure for each software robot to securely acquire any needed access credentials before operating to access cloud-based services offered by remote service providers.

Therefore, there is a need for improved approaches to permit software robots to gain authorized access to cloud-based service offered by remote service providers.

SUMMARY

Embodiments disclosed herein concern improved techniques for secure access to cloud-based services via a gateway proxy. The improved techniques can efficiently manage remote access to cloud-based services by local processing agents in a secure manner using an intermediate authentication token issued by a gateway proxy to local processing agents that are authorized. The local processing agents operate on behalf of users; however, the users need to be authorized to use local processing agents. The intermediate authentication token can be used to obtain authentication credentials of service providers that are needed to access the cloud-based services that are offered by service providers. In some embodiments, the authentication credentials of service providers need only be distributed to the gateway proxy and need not be distributed beyond the gateway proxy. Advantageously, the improved techniques enable large numbers of local processing agents to efficiently and securely access cloud-based services. Embodiments of the invention are well suited for use with robotic process automation systems in which local processing agents, such as software agents (e.g., bots or software robots), perform user tasks in an automated fashion.

The invention can be implemented in numerous ways, including as a method, system, device, apparatus (including computer readable medium). Several embodiments of the invention are discussed below.

As a method of authenticating a service request to a cloud-based service of at least one service provider, one embodiment can, for example, include at least: receiving a remote authentication request, the remote authentication request including at least a user identifier corresponding to a user; extracting the user identifier from the remote authentication request; determining whether the user identifier is valid; retrieving an encrypted access identifier corresponding to the user identifier, provided that the determining has determined that the user identifier is valid; forming an authentication token request, the authentication token request including at least the encrypted access identifier; sending the authentication token request to a gateway proxy providing a gateway to the cloud-based service of the at least one service provider; subsequently receiving an authentication token from the gateway proxy; and returning the authentication token received from the gateway proxy in response to the remote authentication request.

As a non-transitory computer readable medium including at least computer program code tangible stored thereon for authenticating a service request to a cloud-based service of at least one service provider, one embodiment can, for example, include at least: computer program code for receiving a remote authentication request, the remote authentication request including at least a initial identifier corresponding to a user; computer program code for extracting the initial identifier from the remote authentication request; computer program code for determining whether the initial identifier is valid; computer program code for retrieving an encrypted access identifier corresponding to the initial identifier, provided that the computer program code for determining has determined that the initial identifier is valid; computer program code for forming an authentication token request, the authentication token request including at least the encrypted access identifier; computer program code for sending the authentication token request to a gateway proxy providing a gateway to the cloud-based service of the at least one service provider; computer program code for subsequently receiving an authentication token from the gateway proxy; and computer program code for returning the authentication token received from the gateway proxy in response to the remote authentication request.

As a method of authenticating an agent-based service request to a cloud-based service of a service provider, one embodiment can, for example, include at least: sending a service request, by a local processing agent, to a proxy gateway for access to a service provider cloud-based service; determining, at the proxy gateway, that the local processing agent is authorized to access the service provider cloud-based service; acquiring, at the proxy gateway, an authentication credential if the determining determines that the local processing agent is authorized to access the service provider cloud-based service; modifying, at the proxy gateway, the service request to include or reference the authentication credential; providing, to the server provider cloud-based service, the modified service request; and receiving, from the service provider cloud-based service, a response to the service request.

As a non-transitory computer readable medium including at least computer program code tangible stored thereon for authenticating an agent-based service request to a cloud-based service of a service provider, one embodiment can, for example, include at least: computer program code for sending a service request, by a local processing agent, to a proxy gateway for access to a service provider cloud-based service; computer program code for determining, at the proxy gateway, that the local processing agent is authorized to access the service provider cloud-based service; computer program code for acquiring, at the proxy gateway, an authentication credential if the computer program code for determining determines that the local processing agent is authorized to access the service provider cloud-based service; computer program code for modifying, at the proxy gateway, the service request to include or reference the authentication credential; computer program code for providing, to the server provider cloud-based service, the modified service request; and computer program code for receiving, from the service provider cloud-based service, a response to the service request.

As a method of accessing cloud-based services of at least one service provider via a gateway proxy, one embodiment can, for example, include at least: receiving a service request from a local processing agent of a processing system, the service request seeking access to a cloud-based service of the at least one service provider, the service request including at least service information and an authentication token; extracting the authentication token from the service request; determining whether the authentication token is valid; retrieving access credentials for access to a cloud-based service; forming a service call for the cloud-based service, the service call including the service information and the access credentials; and making the service call to the at least one service provider.

As a non-transitory computer readable medium including at least computer program code tangible stored thereon for accessing cloud-based services of at least one service provider, one embodiment can, for example, include at least: computer program code for receiving a service request, the service request seeking access to a cloud-based service of the at least one service provider, the service request including at least an authentication token; computer program code for extracting the authentication token from the service request; computer program code for determining whether the authentication token is valid; computer program code for retrieving access credentials for access to a cloud-based service; computer program code for forming a service call for the cloud-based service, the service call including service input parameters and the access credentials; and computer program code for issuing the service call to the at least one service provider.

As a robotic process automation system, one embodiment can, for example, include at least: a data store configured to store a plurality of software processing agents, each of the software processing agents pertaining to a series of user-initiated events with one or more software programs operating on one or more computing devices; a software processing agent management system configures to control usage of the software processing agents for operation; a gateway proxy for controlling access to a cloud-based service available from a service provider; and a software processing agent authorization system configured to receive authorization request from a particular software processing agent of the software processing agents, and to authenticate the authorization request with the RPA system, and to authenticate the particular software processing agent with the gateway proxy for access to the cloud-based service available from the service provider.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF CERTAIN EMBODIMENTS

Figure 1:
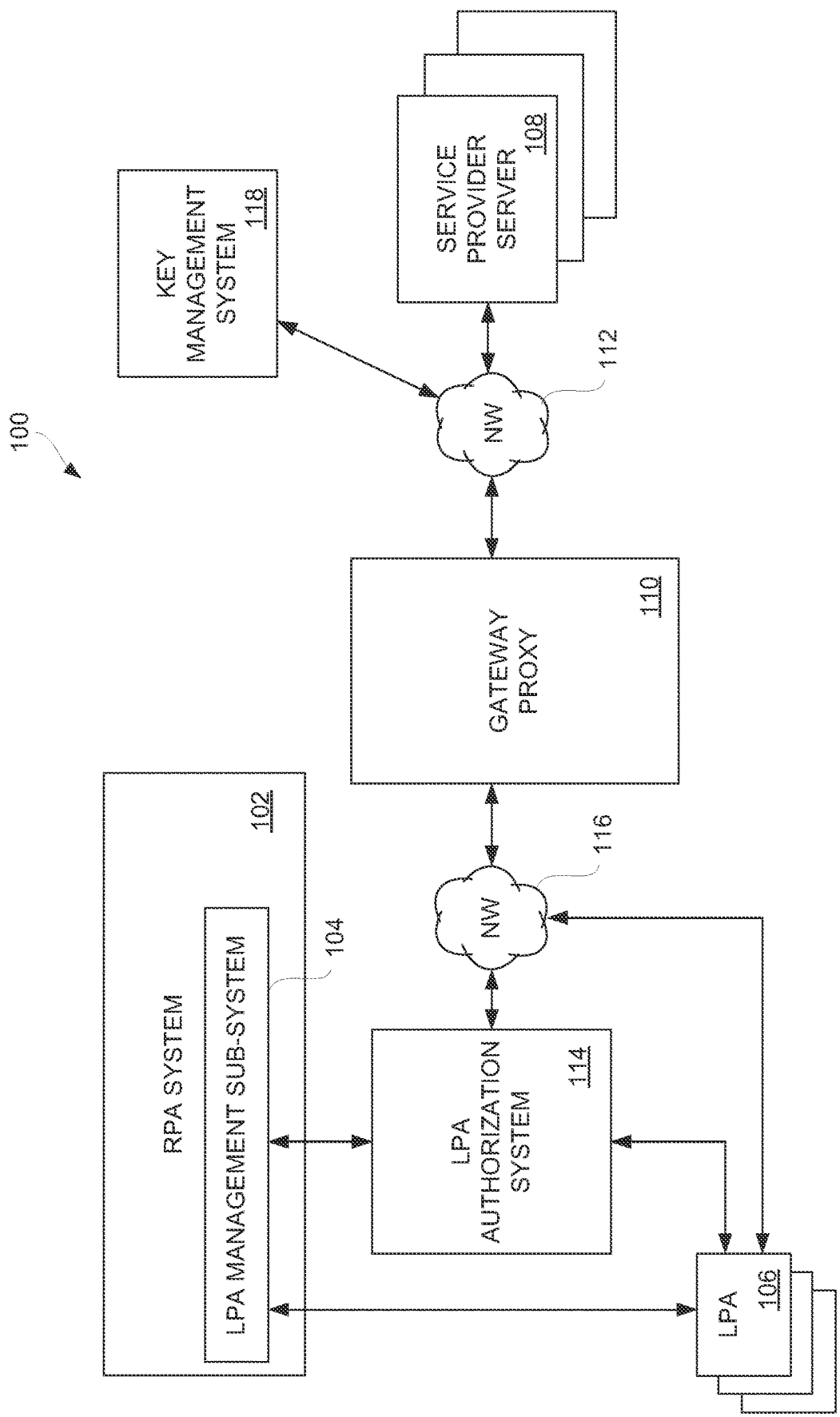
FIG. 1 is a block diagram of a proxy-based access control system according to one embodiment.

Embodiments disclosed herein concern improved techniques for secure access to cloud-based services via a gateway proxy. The improved techniques can efficiently manage remote access to cloud-based services by local processing agents in a secure manner using an intermediate authentication token issued by a gateway proxy to local processing agents that are authorized. The local processing agents operate on behalf of users; however, the users need to be authorized to use local processing agents. The intermediate authentication token can be used to obtain authentication credentials of service providers that are needed to access the cloud-based services that are offered by service providers. In some embodiments, the authentication credentials of service providers need only be distributed to the gateway proxy and need not be distributed beyond the gateway proxy. Advantageously, the improved techniques enable large numbers of local processing agents to efficiently and securely access cloud-based services. Embodiments of the invention are well suited for use with robotic process automation systems in which local processing agents, such as software agents (e.g., bots, software robots, or software automation processes), perform user tasks in an automated fashion.

Generally speaking, RPA systems use computer software to emulate and integrate the actions of a human interacting within digital systems. In an enterprise environment, these RPA systems are often designed to execute a business process. In some cases, the RPA systems use Artificial Intelligence (AI) and/or other machine learning capabilities to handle high-volume, repeatable tasks that previously required humans to perform. The RPA systems support a plurality of software automation processes. The RPA systems also provide for creation, configuration, management, execution, monitoring, and performance of software automation processes.

A software automation process can also be referred to as a software robot, software agent, or a bot. A software automation process can interpret and execute tasks on your behalf. Software automation processes are particularly well suited for handling a lot of the repetitive tasks that humans perform every day. Software automation processes can perform a task or workflow they are tasked with once or 10,000 times and do it consistently, accurately and reliably. As one example, a software automation process can locate and read data in a document, email, file, or window. As another example, a software automation process can recognize characters within a document image using Optical Character Recognition (OCR) technology, then extract certain content therefrom, and then store the extracted content in a database. As another example, a software automation process can connect with one or more Enterprise Resource Planning (ERP), Customer Relations Management (CRM), core banking, and other business systems to distribute data where it needs to be in whatever format is necessary. As another example, a software automation process can perform data tasks, such as reformatting, extracting, balancing, error checking, moving, copying, etc. As another example, a software automation process can grab data desired from a webpage, application, screen, file, or other data source. As still another example, a software automation process can be triggered based on time or an event, and can serve to take files or data sets and move them to another location, whether it is to a customer, vendor, application, department, or storage. These various capabilities can also be used in any combination. As an example of an integrated software automation process, the software automation process can start a task or workflow based on a trigger, such as a file being uploaded to a file transfer protocol (FTP) system. The integrated software automation process can then download that file, scrape relevant data from it, upload the relevant data to a database, and then send an email to inform the recipient that the data has been successfully processed.

Embodiments of various aspects of the invention are discussed below with reference to FIGS. 1-11. However, those skilled in the art will readily appreciate that the detailed description given herein with respect to these figures is for explanatory purposes as the invention extends beyond these limited embodiments.

FIG. 1 is a block diagram of a proxy-based access control system 100 according to one embodiment. The proxy-based access control system 100 includes a RPA system 102 that controls overall operation the RPA environment, including the management of local processing agents. In this regard, the RPA system 102 includes a Local Processing Agent (LPA) management sub-system 104. The LPA management sub-system 104 can manage the activation and control of a plurality of local processing agents 106.

The local processing agents 106 operate independently to perform processing with respect to one or more local application programs and/or one or more remote cloud-based services offered by one or more service providers. The one or more local application programs operate on at least one computer or can operate on multiple computers. In one embodiment, the local processing agent can operate on the same computer as the computer operating the one or more local application programs. The one or more remote cloud-based services can be performed by a server computer associated with the service provider of the respective cloud-based service. In this regard, the proxy-based access control system 100 illustrates a plurality of service provider servers 108. Access to the cloud-based services provided by these service provider servers 108 can be controlled by a gateway proxy 110. The cloud-based services available from service providers are numerous and can vary widely.

For example, Microsoft Azure offers hundreds of services within various categories including AI+Machine Learning, Analytics, Blockchain, Compute, Computer Vision, Containers, Databases, Developer Tools, DevOps, Identity, Integration, Internet of Things, Management, Media, Microsoft Azure Stack, Migration, Mixed Reality, Mobile, Networking, Security, Storage, Web, and Windows Virtual Desktop. As another example, Amazon Web Services (AWS) offers hundreds of services, including Virtual Private Cloud, AWS Data Transfer, Simple Storage Service, DynamoDB, Elastic Compute Cloud, AWS Key Management Service, Simple Notification Service, Relational Database Service, Simple Queue Service, and Simple Email Service.

As a particular example, a service provider can offer OCR processing of electronic documents. As a specific example, Microsoft Corporation provide its Azure platform that includes a Computer Vision service that is an AI service that analyzes content in images and video using OCR technology.

The gateway proxy 110 controls access to these cloud-based services such that only authorized users are permitted access. The gateway proxy 110 provides an access point to the service provider servers 108 that host the cloud-based services. The gateway proxy 110 and the service provider servers 108 can be coupled to a network 112. The network 112 can be a local area network, a wide-area network, or a global network (e.g., the Internet). The gateway proxy 110 can also be referred to as a proxy server or API gateway, but generally speaking a gateway proxy typically offers more robust features, such as with respect to security, monitoring, etc.

The proxy-based access control system 100 can also include a LPA authorization system 114. The LPA authorization system 114 is coupled between the local processing agents 106 and the gateway proxy 110. Typically, the LPA authorization system 114 couples to the gateway proxy 110 over a network 116. The network 116 can be a local area network, a wide-area network, or a global network (e.g., the Internet). The network 116 can be the same as the network 112 or can be a different network.

When one of the local processing agents 106 seeks to utilize a cloud-based service offered by one of the service providers 108, the local processing agent 106 initially interacts with the LPA authorization system 114 in an effort to acquire an authentication token that can be later provided to the gateway proxy 110 as evidence of the user's authorization to access the cloud-based service provided by the service provider server 108. The LPA authorization system 114 recognizes a user (e.g., person, company, etc.) seeking to utilize the local processing agent 106 that desires access to the cloud-based service. The LPA authorization system 114 can then interact with the LPA management sub-system 104 to determine whether the particular user is permitted to utilize the cloud-based service being sought. If so, the LPA management sub-system 104 can provide an access identifier to the LPA authorization system 114. After receiving the access identifier, the LPA authorization system 114 can direct a token request to the gateway proxy 110. The token request includes at least the access identifier provided by the LPA management sub-system 104. Depending on implementation, the token request can also include additional information, such as a service provider identifier for which access is or will be requested.

In one implementation, the token request can be initiated at the LPA authorization system 114. In such case, the LPA authorization system 114 receives the access identifier from the LPA management sub-system 104 and forms the token request for the gateway proxy 110. Thereafter, the LPA authorization system 114 can interact with the gateway proxy 110 via the network 116 to request an authentication token for access to the cloud-based service. In doing so, the LPA authorization system 114 provides the access identifier to the gateway proxy 110.

In another implementation, the token request can be initiated by the local processing agent 106. In this case, the local processing agent 106 receives the access identifier directly from the LPA management sub-system 104 or indirectly from the LPA authorization system 114, and then the local processing agent 106 forms the token request for the gateway proxy 110. Thereafter, the local processing agent 106 can interact with the gateway server 110 via the network 116 to request an authentication token for access to the cloud-based service. In doing so, the local processing agent 106 provides the access identifier to the gateway proxy 110.

In either case, the gateway proxy 110 can then determine whether the access identifier is valid and, if so, return an authentication token to the local processing agent 106. In one implementation, the authentication token is returned to the local processing agent 106 via the LPA authorization system 114. Here, the authentication token can be generated at the gateway proxy 110 and then provided to the local processing agent 106. In another implementation, the authentication token is returned directly to the local processing agent 106.

In one embodiment, the gateway proxy 110 can also limit the authentication token it provides such that it useful only for access cloud-based resources of a particular service provider that was identified by a service provider identifier provided with the token request directed to the gateway proxy 110. For example, the service provider identifier can be encoded or embedded into the authentication token.

Next, the local processing agent 106 can initiate a service request to the service provider server 108 providing the cloud-based service that is being requested. The service request is directed to the gateway proxy 110 where the authentication token is validated. If the authentication token is determined to be valid by the gateway proxy 110, then appropriate access credentials can be accessed. The access credentials for one or more service providers can be securely stored in a key management system 118. Here, the access credentials are centrally stored and available to the gateway proxy 110. Hence, if a service provider desires to update or change their access credentials, the service provider need only update the access credentials at the key management system 118 because access credentials need not be delivered downstream from the gateway proxy 110, such as, for example to the LPA authorization system 114, the RPA system 102 or the local processing agents 106.

Access credentials for a service provider are needed before you can successfully access cloud-based service from the service provider. These access credentials can also be referred to as API credentials. In general access credentials are unique identifiers, such as passwords, tokens or keys, that must be added to code before accessing cloud-based service from the service provider.

Thereafter, a service call with the access credentials can be provided to the service provider server 108 so that the local processing agent 106 can obtain the requested cloud-based service from the service provider 108. In one implementation, the service call can be formed by modifying the service request to include the access credentials, and then the service call can be forwarded to the service provider server 108. For example, in forming the service call, the service request can be modified by injecting the access credentials into the service request. In another implementation, the service call, which includes the access credentials, can be newly formed at the gateway proxy 110. The results from the cloud-based service in response to the service call can be returned to the local processing agent 106 by way of the gateway proxy 110.

Additionally, in one implementation, the gateway proxy 110 in response to the service request can validate the authentication token and can confirm that the service request is directed to the same service provider as which the authorization token was originally requested by the token request.

Figure 2:
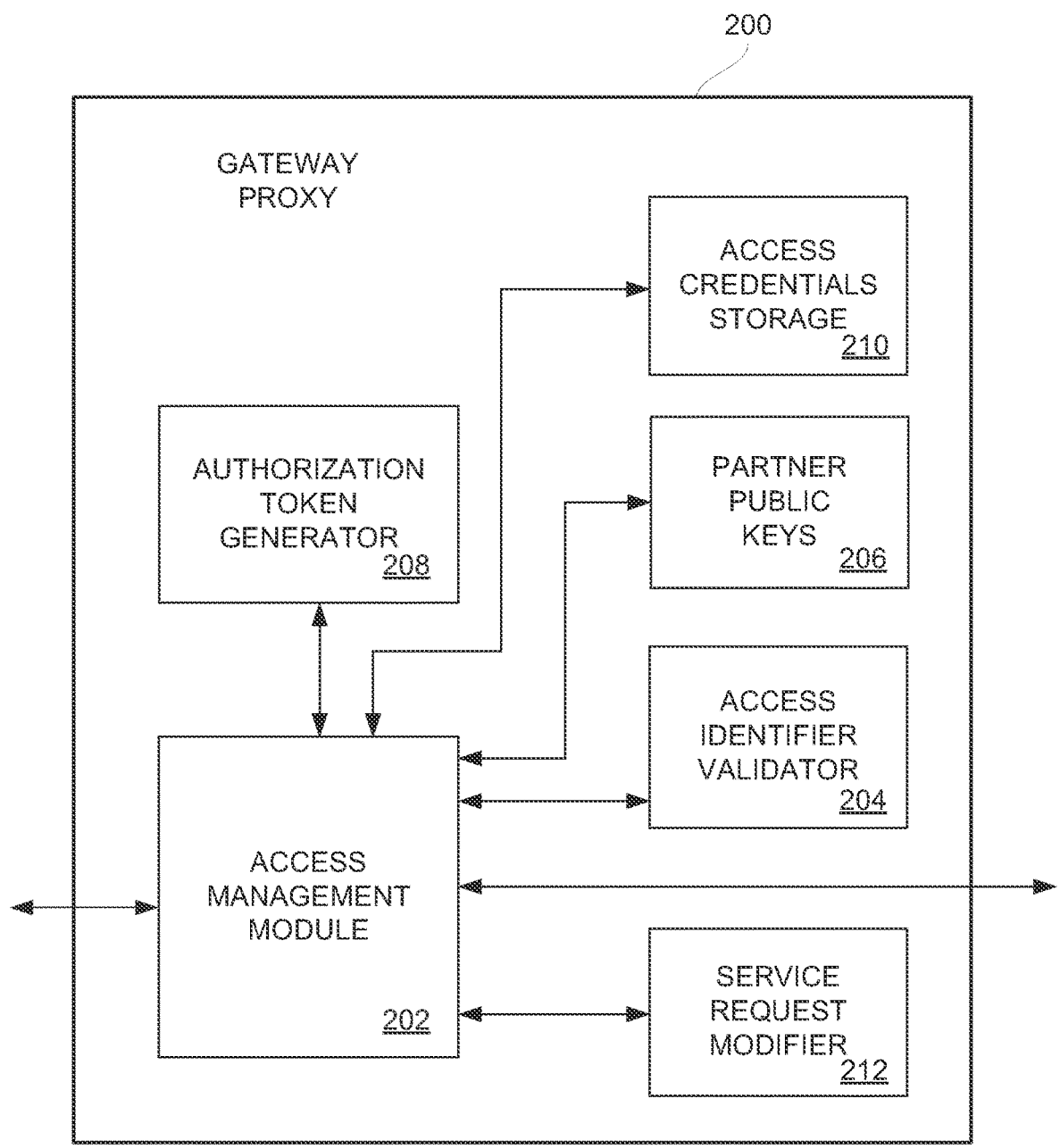
FIG. 2 is a block diagram of a gateway proxy according to one embodiment.

FIG. 2 is a block diagram of a gateway proxy 200 according to one embodiment. The gateway proxy 200 is, for example, suitable for use as the gateway proxy 110 illustrated in FIG. 1.

The gateway proxy 200 includes an access management module 202 that manages operation of the gateway proxy 200. The access management module 202 can evaluate whether requestors (e.g., users, local processing agents, or the like) are authorized and, if so, provide authorization tokens thereto. Additionally, the access management module 202 can permit service requests from requestors that have a valid authorization token to be modified to include the appropriate access credentials and then be directed to an appropriate service provider server for processing. Still further, responses to the service requests can be provided to the requestors via the gateway proxy 200.

The gateway proxy 200 can also include an access identifier validator 204 to validate an access identifier being provided to the gateway proxy 200. The access identifier can, for example, be provided to the gateway proxy 200 in a service request from the local processing agent 106 or via the LDA authorization system 114 supporting the local processing agent 106. The gateway proxy 200 can also include partner public keys 206. For example, the gateway proxy 200 and the RPA system can agree on a set of encryption keys, such as a public key and a private key. In validating the access identifier by the access identifier validator 204, one or more of the partner public keys 206 can be utilized. In one implementation, the access identifier is an encrypted access identifier, which can also be referred to as a signed access identifier. For example, the access identifier can be encrypted using a private key. The access identifier validator 204 can determine validity of the encrypted access identifier by decrypting (or unsigning) the encrypted access identifier using one or more of the partner public keys 206. If the encrypted access identifier is able to be successfully decrypted, then the encrypted access identifier can be considered valid.

In the event that the access identifier is successfully validated, the gateway proxy 200 can utilize an authorization token generator 208. The authorization token generator 208 typically generates an authorization token for use by a local processing agent, such as the local processing agent 106 illustrated in FIG. 1. In one implementation, the authorization token is time-limited, such that after predetermined period of time, the authorization token is no longer valid. For example, the predetermined period of time can be one (1) hour, thirty (30) minutes, or any other desired predetermined period of time. In the same or another implementation, when generating the authentication token, the authorization token generator 208 can include a service provider identifier, such that the resulting authorization token encrypts or encodes with or within the authentication token.

The gateway proxy 200 can also store access credentials in an access credentials storage 210. The access credentials are, for example, keys or codes that are needed to successfully access cloud-based services at a service provider server (e.g., service provider server 108). As an example, the access credentials storage 210 can obtain access credentials for various service providers from the key management system 118 illustrated in FIG. 1.

Further still, the gateway proxy 200 can also include a service request modifier 212. The service request modifier 212 can receive a service request from a local processing agent that contains an authorization token. The gateway proxy 200 can then determine whether the authorization token is valid. Since the gateway proxy 200 previously generated the authentication token and provided the authentication token to the local processing agent, the gateway proxy 200 is able to determine if the authentication token is valid. If the authorization token is valid, then the access management module 202 can retrieve the appropriate access credentials from the access credentials storage 210 and then cause the service request modifier 212 to modify the incoming service request to include the retrieved appropriate access credentials. The access management module 202 can then permit the modified incoming service request to be provided to the appropriate service provider, such that the local processing agent is able to access the cloud-based service at the service provider server, such as the service provider server 108 illustrated in FIG. 1. In an alternative embodiment, the service request modifier 212 can be replaced with a service call generator that generates a service call the include the appropriate access credentials as well as service information. In any case, the modified service request or the generated service call can include service information, access credentials, and any other desired data or information. The service information can include one or more of: a service provider indication, a service indication, service input parameters, and at least one digital asset. The service provider indication denotes a service provider to which the service request/call is directed. The service indication specifies the cloud-based service requested from the service provider. The service input parameters are inputs that are supplied to and used as inputs for processing by the cloud-based service. The at least one digital asset is one or more electronic files, documents or data that is to be processed by the cloud-based service.

Figure 3:
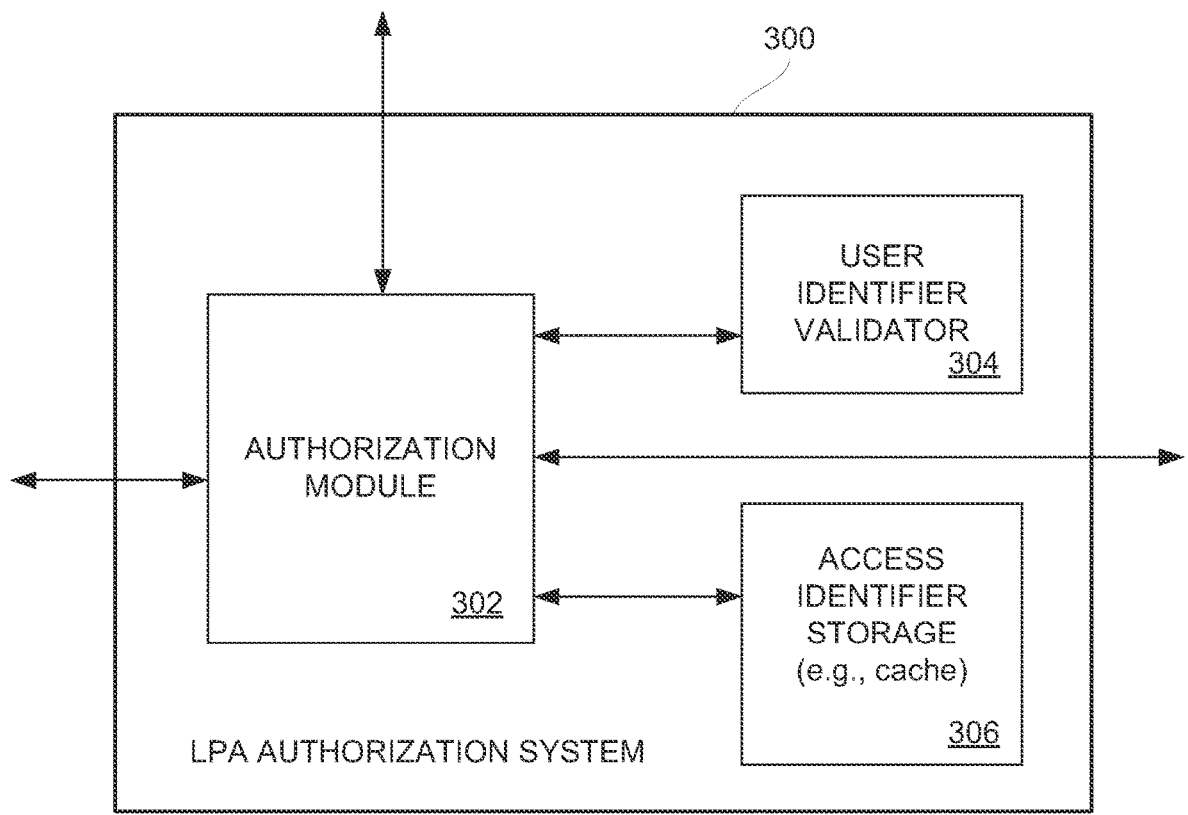
FIG. 3 is a block diagram of a local processing agent authorization system according to one embodiment.

FIG. 3 is a block diagram of a LPA authorization system 300 according to one embodiment. The LPA authorization system 300 illustrated in FIG. 3 is, for example, suitable for use as the LPA authorization system 114 illustrated in FIG. 1.

The LPA authorization system 300 can include an authorization module 302. The authorization module 302 can determine whether a particular user is authorized to access particular cloud-based services. In doing so, the LPA authorization system 300 includes a user identifier validator 304 and an access identifier storage 306. The user identifier validator 304 can serve to validate a user identifier provided by a local processing agent seeking authorization to access a cloud-based service offered by a service provider. The access identifier storage 306 is, for example, a cache memory. The encrypted access identifier storage 306 can store access identifiers. In one implementation, the access identifiers are encrypted access identifiers. Also, in one implementation, the access identifiers are valid only for a limited period of time and expire after a predetermined period of time. The authorization module 302 can access the access identifier storage 306 to retrieve an access identifier. If such access identifier has been recently stored to the access identifier storage 306, it is valid and can be used. Otherwise, if the access identifier is not present within the access identifier storage 306 or if the access identifier has expired (i.e., after its limited period of time), then the authorization module 302 would need to interact with the LPA management sub-system 104 of the RPA system 102, as illustrated in FIG. 1, to retrieve an access identifier. Again, in one implementation, the access identifier is an encrypted access identifier, and the access identifier storage 306 stores encrypted access identifiers.

Figure 4:
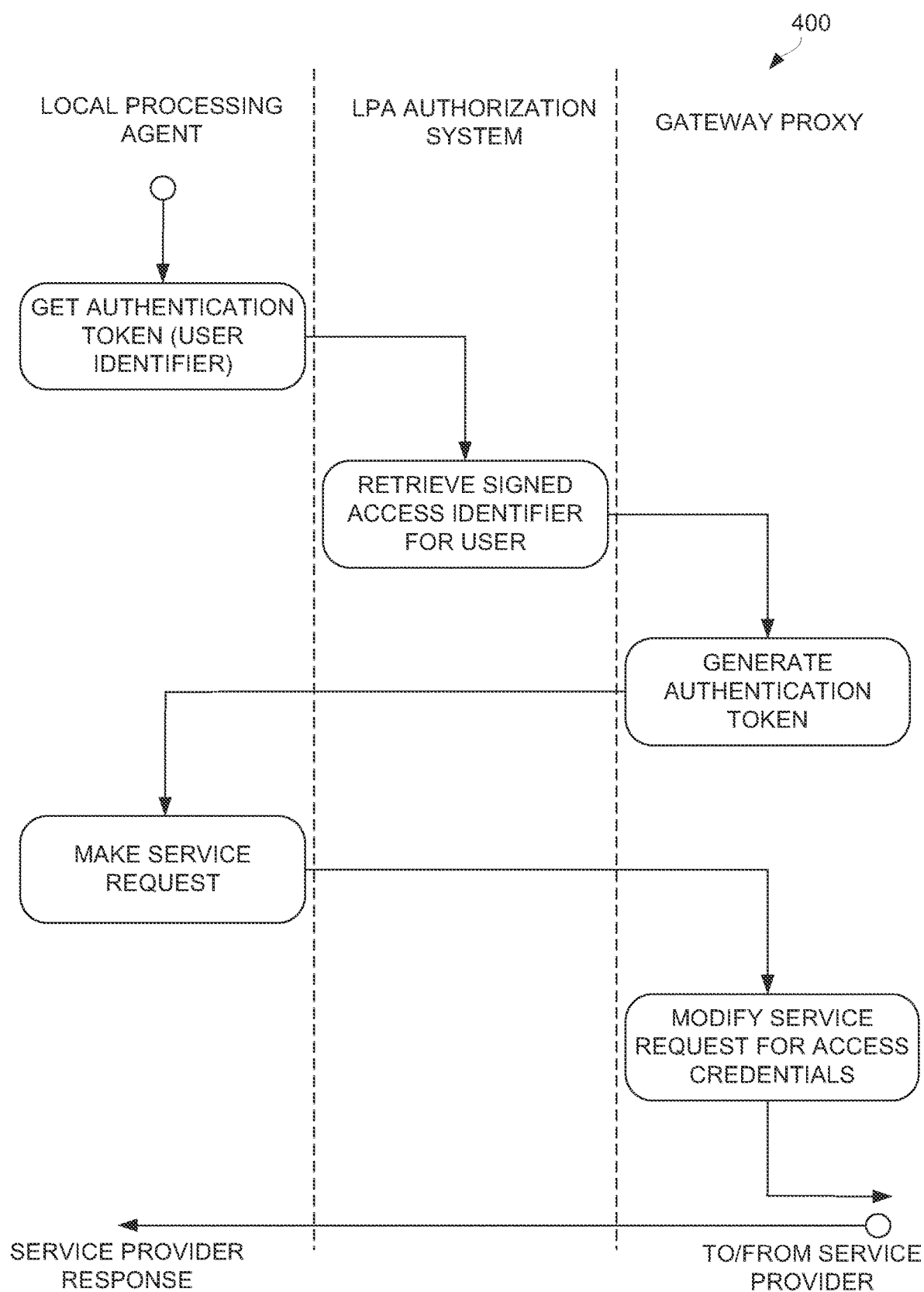
FIG. 4 is a process diagram of a proxy authentication process according to one embodiment.

FIG. 4 is a process diagram of a proxy authentication process 400 according to one embodiment. The proxy authentication process 400 is shown with actions occurring in different processing systems. Those processing systems include a local processing agent, a LPA authorization system, and a gateway proxy. In general, the local processing agent is seeking to gain access to a service provider offering one or more cloud-based services. In order to do so, the local processing agent interacts with the LPA authorization system and the gateway proxy. As shown in FIG. 4, at the local processing agent, a get authentication token request is made. The get authentication token includes an indication of a user identifier for the user operating the local processing agent. The get authorization token request is directed to the LPA authorization system. At the LPA authorization system, the user identifier is validated and a signed access identifier for the user is retrieved. That signed access identifier can then be provided to the gateway proxy. At the gateway proxy, the signed access identifier can be validated. If the signed access identifier is determined to be valid, then an authentication token can be generated at the gateway proxy. The authentication token can then be returned back to the LPA authorization system and then further returned back to the local processing agent. At this point, the local processing agent has the authentication token that is needed to make a service request to the gateway proxy for access to the cloud-based services of the service provider. Hence, at the local processing agent, a service request is made to seek access to the cloud-based services, where the service request includes at least the authentication token. The service request is provided to the gateway proxy where the authentication token provided with that service request is validated. If the authentication token is valid, then the service request can be modified to include the appropriate access credentials for the cloud-based service being sought by the local processing agent. At this point, the service call is then directed to the service provider for suitable processing. Typically, later, the service provider returns a service provider response back to the local processing agent by way of the gateway proxy. The service provider response back provides the results of the requested service request.

Figure 5A:
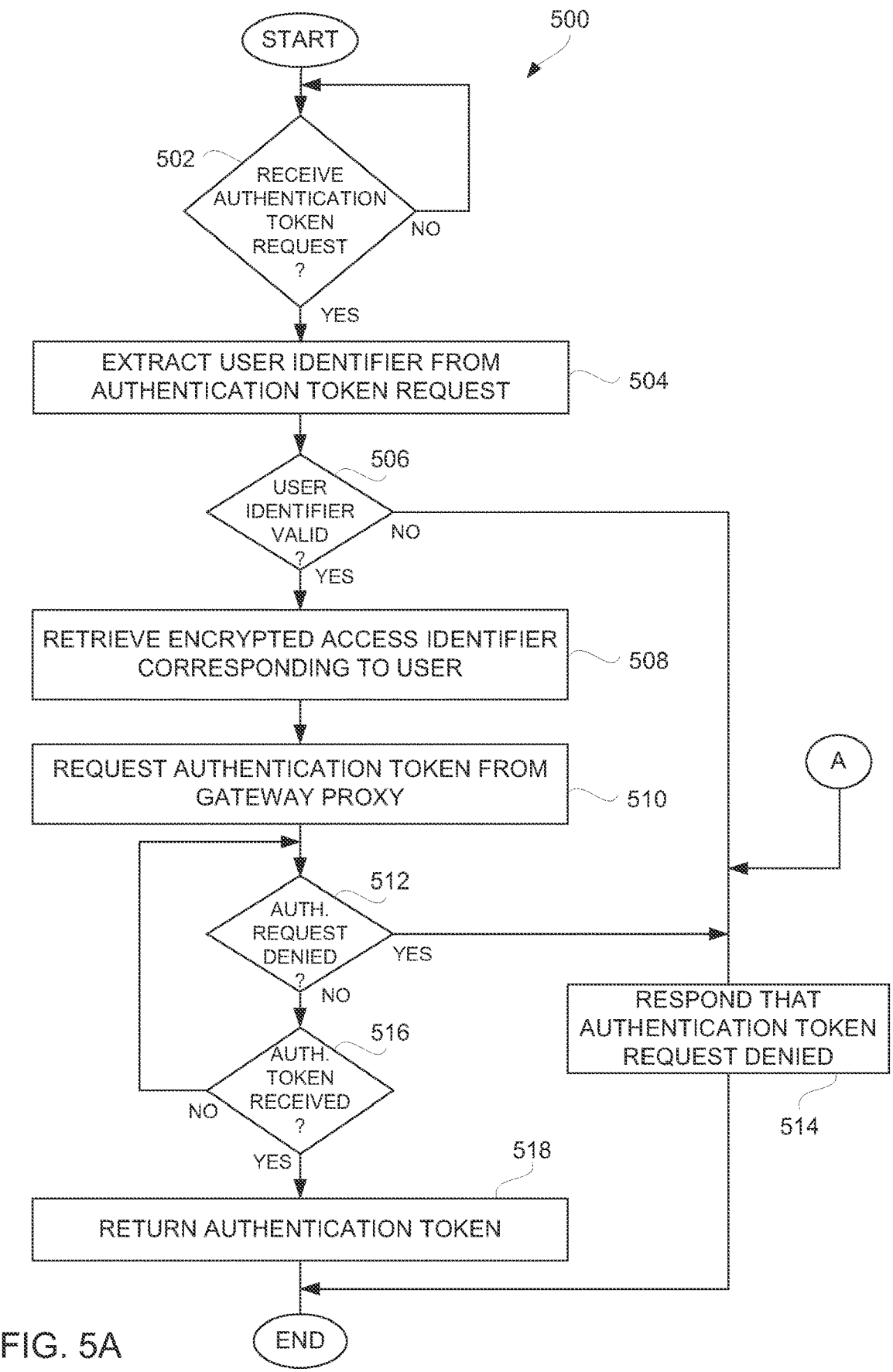
FIGS. 5A and 5B are flow diagrams of an authentication token process according to one embodiment.
Figure 5B:
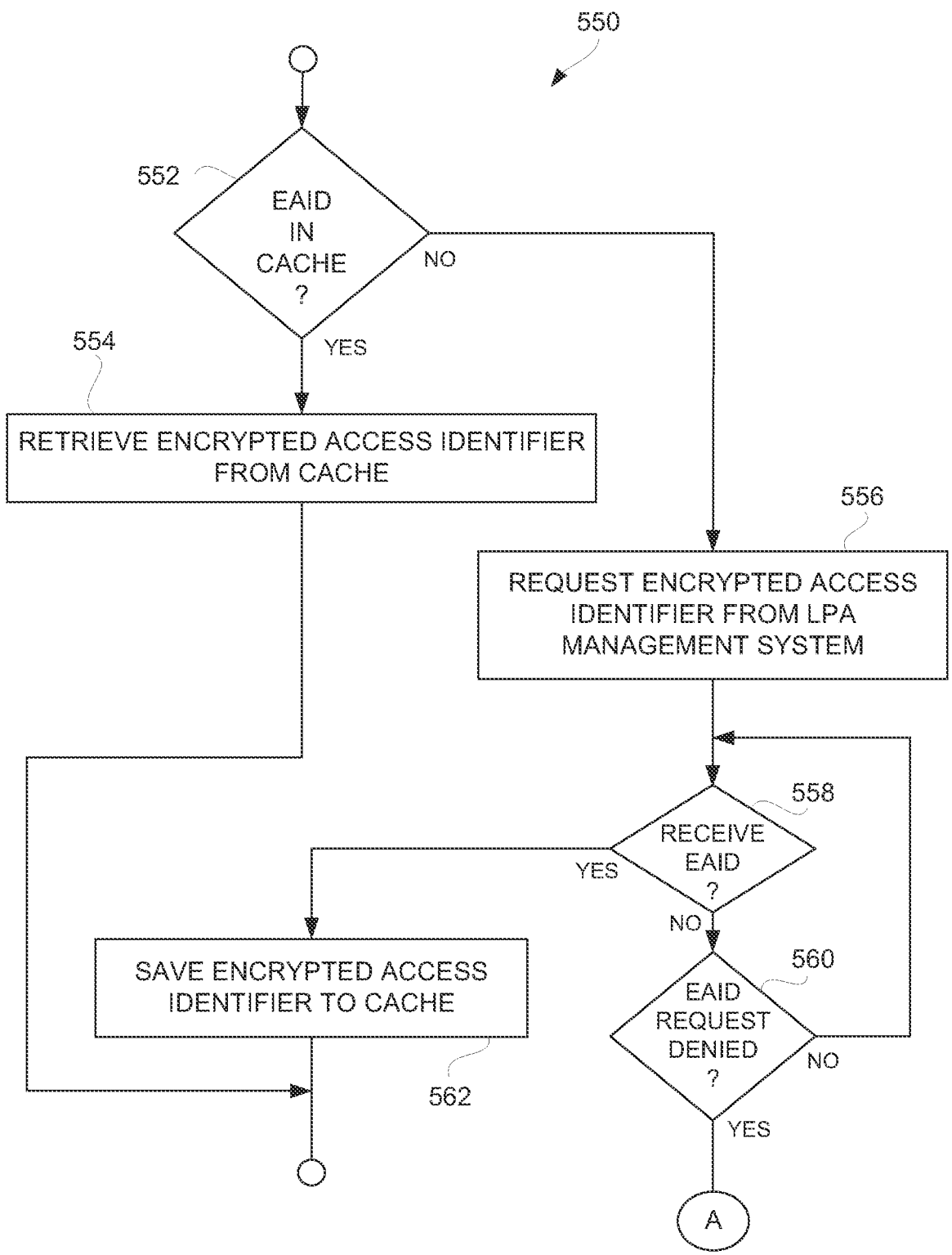

FIGS. 5A and 5B are flow diagrams of an authentication token process 500 according to one embodiment. The authentication token process 500 can, for example, be performed by an LPA authorization system, such as the LPA authorization system 114 illustrated in FIG. 1.

The authentication token process 500 can begin with a decision 502 that determines whether an authentication token request has been received. Typically, the authentication token request is initiated by a service requestor. For example, the service requestor can be a local processing agent, such as one of the local processing agents 106 illustrated in FIG. 1.

When the decision 502 determines that an authentication token request has not been received, then the authentication token process 500 can await such a request. On the other hand, when the decision 502 determines that an authentication token request has been received, a user identifier can be extracted 504 from the authentication token request. As an example, the authentication token request is typically initiated by a local processing agent on behalf of a user and thus the authentication token request typically includes a user identifier pertaining to that user.

After the user identifier has been extracted 504 from the authentication token request, a decision 506 can determine whether the user identifier is valid. In one embodiment, the user is associated with a local processing system that provides and/or supports local processing agents to carry out various processing tasks. In one implementation, the local processing system is a RPA system that utilizes software processing agents, sometimes referred to as "bots", to perform processing in an automated fashion. The local processing system provides rights and privileges to its users, which are identified by user identifiers. For example, a user can be licenses or permitted by the local processing system for certain usage of the abilities offered by the local processing system. Hence, if a given user, as identified by their user identifier, has adequate rights and privileges, one or more local processing agents can operate on behalf of the user to perform various processing tasks, including accessing cloud-based services offered by service providers. Hence, the decision 506 determines whether the user, as identified by the user identifier, has adequate rights and privileges to be permitted to make an authentication token request.

When the decision 506 determines that the user identifier is valid, an encrypted access identifier corresponding to the user can be retrieved 508. The encrypted access identifier is an encrypted key or signed token that is used to authenticate the user to a gateway proxy. In one implementation, the encrypted access identifier can be retrieved 508 from a LPA management sub-system, such as the LPA management sub-system 104 illustrated in FIG. 1.

Next, an authentication token can be requested 510 from the gateway proxy. In this regard, a request for an authentication token can include the encrypted access identifier. Then, the gateway proxy can authenticate the request for an authentication token using the encrypted access identifier that was provided with the authentication token request. In one implementation, the encrypted access identifier was signed using a private key at the LPA management sub-system and then unsigned using a public key at the gateway proxy. If the unsigning of the encrypted access identifier is successful, then the authentication token request is deemed authenticated and thus an authentication token can be provided by the gateway proxy to the LPA authorization system.

In response to the authentication token request, the authentication token process 500 can perform a decision 512. The decision 512 can determine whether the request for an authentication token has been denied by the gateway proxy. If the request for the authentication token has been denied, the authentication token process 500 can respond 514 that the authentication token request has been denied. For example, the local processing agent making the authentication token request can be informed that the authentication token request has failed.

Alternatively, if the request for the authentication token has not been denied, then a decision 516 can determine whether the authentication token being requested has been received from the gateway proxy. When the decision 516 determines that the authentication token has not been received, the authentication token process 500 can return to repeat the decision 512 until the authentication token has been received. When the decision 516 determines that the authentication token has been received from the gateway proxy, the authentication token can be returned 518. Here, for example, the authentication token is returned to the service requestor, which is typically a local processing agent seeking to gain access to cloud-based services offered by a service provider by way of a gateway proxy. In such case, the authentication token can be returned to the service requestor over a network, either directly or by way of the LPA authorization system. After the authentication token has been returned 518, the authentication token process 500 can end.

FIG. 5B illustrates a flow diagram of an encrypted access identifier retrieval process 550 according to one embodiment. The encrypted access identifier retrieval process 550 represents processing they can be carried out by the block 508 illustrated in FIG. 5A, according to one embodiment.

The encrypted access identifier retrieval process 550 can begin with a decision 552 that determines whether an Encrypted Access Identifier (EAID) that is to be retrieved is stored in a cache memory. For example, as noted above, the LPA authorization system 300 can include an access identifier storage 306, which can be a cache memory configured to store encrypted access identifiers. When the decision 552 determines that the encrypted access identifier is stored in the cache memory, then the encrypted access identifier can be retrieved 554 from the cache memory. At this point, the encrypted access identifier has been retrieved and no additional processing need be performed.

On the other hand, when the decision 552 determines that the encrypted access identifier is not stored in the cache memory, the encrypted access identifier can be retrieved 556 from a LPA management sub-system, such as the LPA management sub-system 104 illustrated in FIG. 1. Next, a decision 558 can determine whether the encrypted access identifier has been received. When the decision 558 determines that the encrypted access identifier has not yet been received, a decision 560 can determine whether access to the encrypted access identifier has been denied. When the decision 560 determines that access to the encrypted access identifier has been denied, then the encrypted access identifier retrieval process 550 returns to the authentication token process 500 of FIG. 5A to respond 514 that the authentication request has been denied. Alternatively, when the decision 560 determines that the encrypted access identifier request has not been denied, then the encrypted access identifier retrieval process 550 can return to repeat the decision 558. Furthermore, when the decision 558 determines that the encrypted access identifier has been received, the encrypted access identifier can be saved 562 to the cache memory. At this point, the encrypted access identifier has been retrieved and the encrypted access identifier retrieval process 550 is completed.

Figure 6:
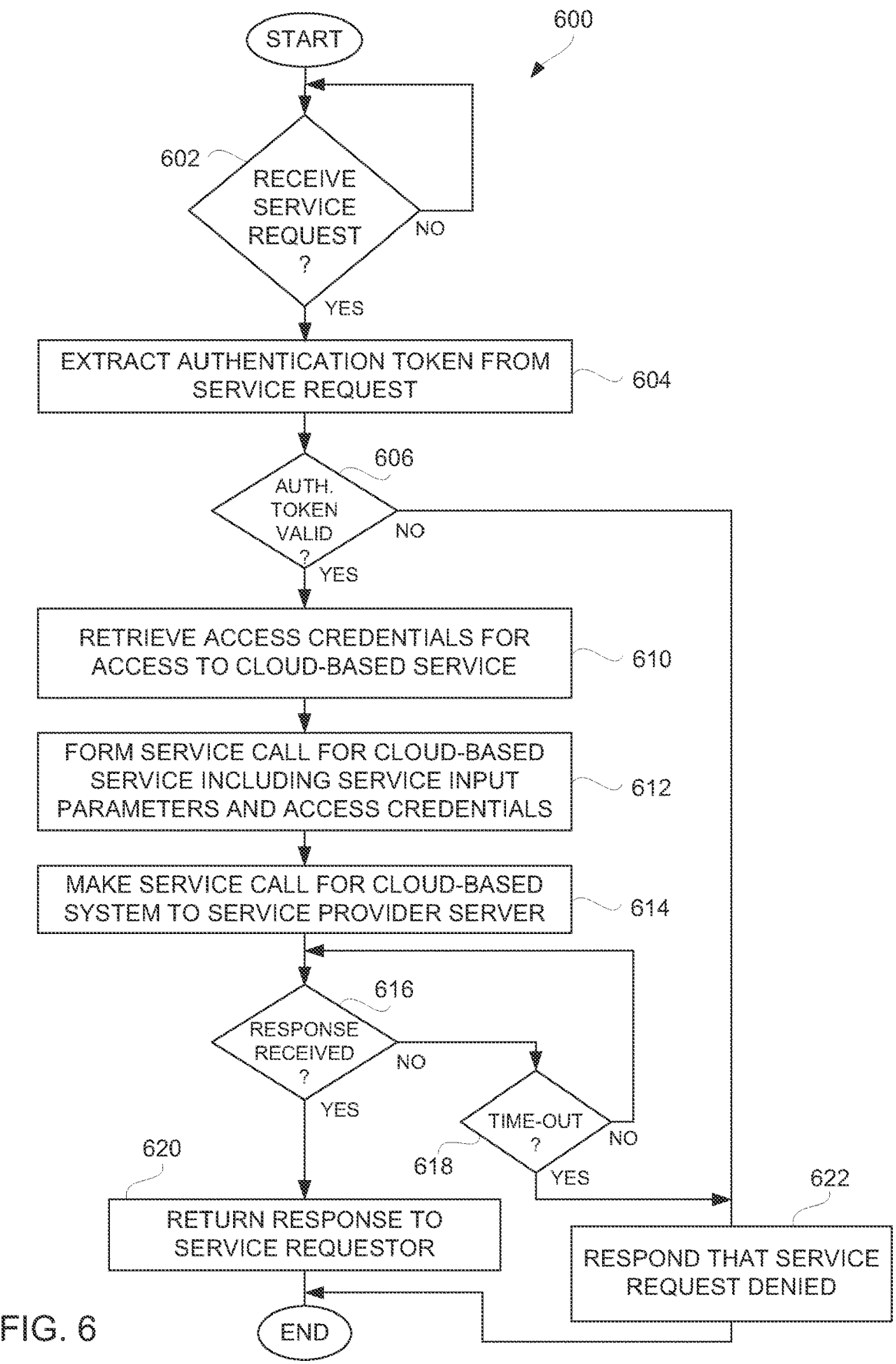
FIG. 6 is a flow diagram of a service request process according to one embodiment.

FIG. 6 is a flow diagram of a service request process 600 according to one embodiment. The service request process 600 can, for example, be performed by a gateway proxy, such as the gateway proxy 110 illustrated in FIG. 1.

The service request process 600 can begin with a decision 602 that determines whether a service request has been received. Typically, the service request is initiated by a service requestor. For example, the service requestor can be a local processing agent, such as one of the local processing agents 106 illustrated in FIG. 1. When the decision 602 determines that a service request has not been received, the service request process 600 can await such a request.

Alternatively, once the decision 602 determines that a service request has been received, the service request process 600 can continue. In this regard, an authentication token can be extracted 604 from the service request. Next, a decision 606 can determine whether the authentication token is valid. Validity of the authentication token is generally a determination that the authentication token is authentic. The authentication token can be considered authentic if the authentication token is as expected (i.e., as previously generated and not tampered with). For example, the authentication token can be decrypted, and if successfully decrypted, then the authentication is valid. However, in one implementation, authentication tokens are time limited. In this implementation, the authentication token provided with the service request can be valid only if the authentication has not time expired. In another implementation, the authentication token can be considered valid only if the service provider identifier encoded or encrypted in the token request matches the service provider identifier identified by the service request.

When the decision 606 determines that the authentication token is valid, then access credentials that are needed to access a cloud-based service can be retrieved 610. Typically, the gateway proxy stores or has access to access credentials for a plurality of different service providers. In one implementation, the service request not only includes an authentication token but also specifies a particular service or service provider for which service is being requested. As such, the access credentials for access to the appropriate cloud-based service provided by a service provider can be retrieved 610.

After retrieving the access credentials, a service call for the cloud-based service can be formed 612. The service call can include service input parameters as well as the access credentials needed to access that cloud-based service. The service input parameters are parameters used by the cloud-based service to carry out the service request. In one implementation, the service input parameters are provided with the service request and are then used in the service call. Thereafter, the service call can be made 614 to a server of the service provider that supports the cloud-based service being requested by the service request.

Next, a decision 616 determines whether a response has been received. When the decision 616 determines that a response is not been received, a decision 618 can determine whether a time-out has occurred. When the decision 618 determines that a time-out has not occurred, the service request process 600 can return to repeat the decision 616 to await receipt of a response to the service call. Once the decision 616 determines that a response to the service call has been received, the response can be returned 620 to the service requestor. Following the return 620 of the response to the service requestor, the service request process 600 can end.

Alternatively, when the decision 606 determines that the authentication token is not valid, then the service request is denied and the service request process 600 can respond 622 to the service requestor that service request has been denied. Also, in the case in which the decision 618 determines that a time-out has occurred, the service request process 600 can respond 622 to the service requestor that service request has been denied. Following the response 622, the service request process 600 can also end.

The various aspects disclosed herein can be utilized with or by RPA systems. Exemplary RPA systems and operations thereof are detailed below.

Figure 7:
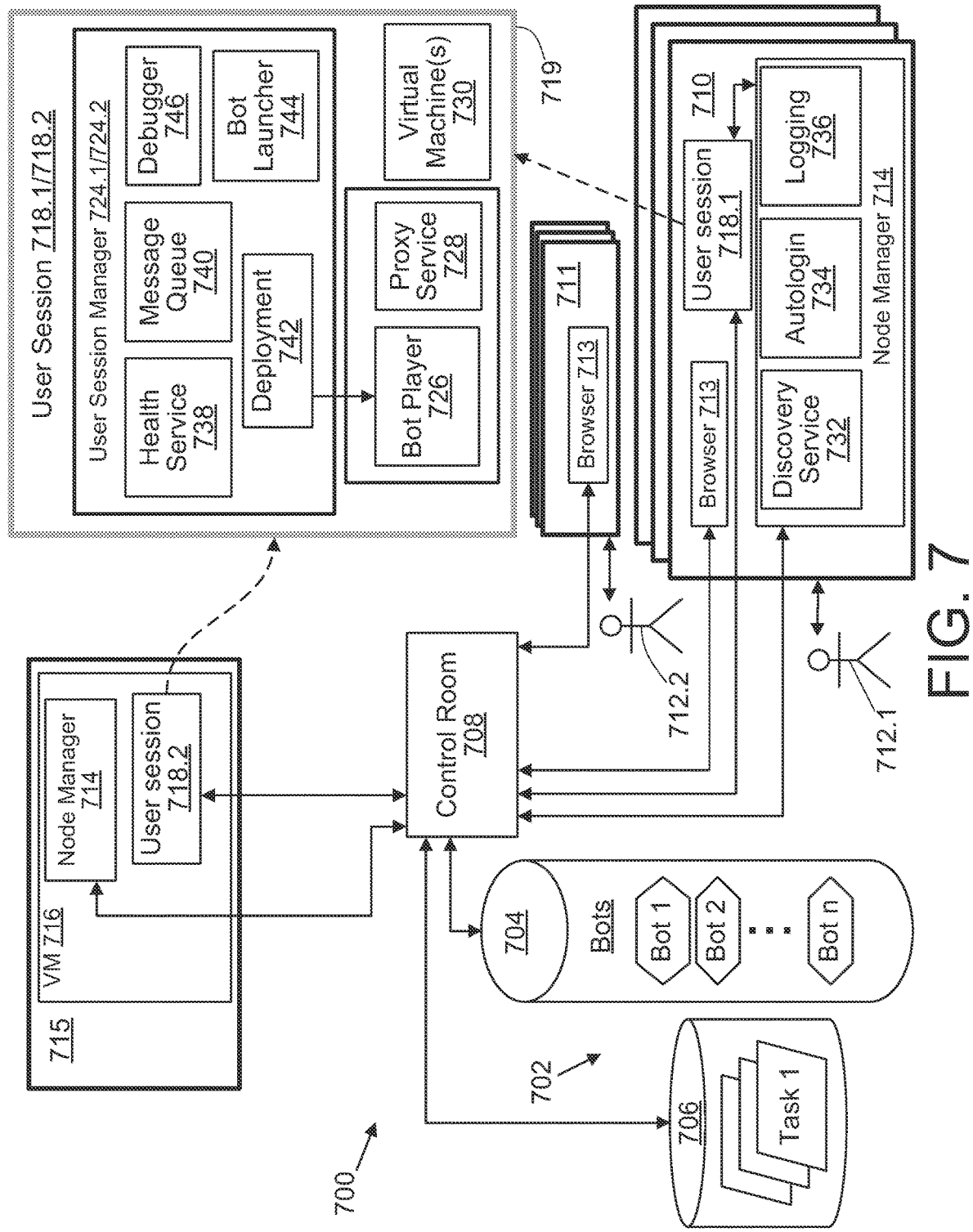
FIG. 7 is a block diagram of a RPA system according to one embodiment.

FIG. 7 is a block diagram of a RPA system 700 according to one embodiment. The RPA system 700 includes data storage 702. The data storage 702 can store a plurality of software robots 704, also referred to as bots (e.g., Bot 1, Bot 2, . . . , Bot n). The software robots 704 can be operable to interact at a user level with one or more user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 726), on which a bot will execute or is executing. The data storage 702 can also stores a plurality of work items 706. Each work item 706 can pertain to processing executed by one or more of the software robots 704.

The RPA system 700 can also include a control room 708. The control room 708 is operatively coupled to the data storage 702 and is configured to execute instructions that, when executed, cause the RPA system 700 to respond to a request from a client device 710 that is issued by a user 712.1. The control room 708 can act as a server to provide to the client device 710 the capability to perform an automation task to process a work item from the plurality of work items 706. The RPA system 700 is able to support multiple client devices 710 concurrently, each of which will have one or more corresponding user session(s) 718, which provides a context. The context can, for example, include security, permissions, audit trails, etc. to define the permissions and roles for bots operating under the user session 718. For example, a bot executing under a user session, cannot access any files or use any applications that the user, under whose credentials the bot is operating, does not have permission to do so. This prevents any inadvertent or malicious acts from a bot under which bot 704 executes.

The control room 708 can provide, to the client device 710, software code to implement a node manager 714. The node manager 714 executes on the client device 710 and provides a user 712 a visual interface via browser 713 to view progress of and to control execution of automation tasks. It should be noted that the node manager 714 can be provided to the client device 710 on demand, when required by the client device 710, to execute a desired automation task. In one embodiment, the node manager 714 may remain on the client device 710 after completion of the requested automation task to avoid the need to download it again. In another embodiment, the node manager 714 may be deleted from the client device 710 after completion of the requested automation task. The node manager 714 can also maintain a connection to the control room 708 to inform the control room 708 that device 710 is available for service by the control room 708, irrespective of whether a live user session 718 exists. When executing a bot 704, the node manager 714 can impersonate the user 712 by employing credentials associated with the user 712.

The control room 708 initiates, on the client device 710, a user session 718 (seen as a specific instantiation 718.1) to perform the automation task. The control room 708 retrieves the set of task processing instructions 704 that correspond to the work item 706. The task processing instructions 704 that correspond to the work item 706 can execute under control of the user session 718.1, on the client device 710. The node manager 714 can provide update data indicative of status of processing of the work item to the control room 708. The control room 708 can terminate the user session 718.1 upon completion of processing of the work item 706. The user session 718.1 is shown in further detail at 719, where an instance 724.1 of user session manager 724 is seen along with a bot player 726, proxy service 728, and one or more virtual machine(s) 730, such as a virtual machine that runs Java® or Python®. The user session manager 724 provides a generic user session context within which a bot 704 executes.

The bots 704 execute on a player, via a computing device, to perform the functions encoded by the bot. Some or all of the bots 704 may in certain embodiments be located remotely from the control room 708. Moreover, the devices 710 and 711, which may be conventional computing devices, such as for example, personal computers, server computers, laptops, tablets and other portable computing devices, may also be located remotely from the control room 708. The devices 710 and 711 may also take the form of virtual computing devices. The bots 704 and the work items 706 are shown in separate containers for purposes of illustration but they may be stored in separate or the same device(s), or across multiple devices. The control room 708 can perform user management functions, source control of the bots 704, along with providing a dashboard that provides analytics and results of the bots 704, performs license management of software required by the bots 704 and manages overall execution and management of scripts, clients, roles, credentials, security, etc. The major functions performed by the control room 708 can include: (i) a dashboard that provides a summary of registered/active users, tasks status, repository details, number of clients connected, number of scripts passed or failed recently, tasks that are scheduled to be executed and those that are in progress; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail logs creation of all actions performed in the control room; (vi) task scheduler—permits scheduling tasks which need to be executed on different clients at any particular time; (vii) credential management—permits password management; and (viii) security: management—permits rights management for all user roles. The control room 708 is shown generally for simplicity of explanation. Multiple instances of the control room 708 may be employed where large numbers of bots are deployed to provide for scalability of the RPA system 700.

In the event that a device, such as device 711 (e.g., operated by user 712.2) does not satisfy the minimum processing capability to run a node manager 714, the control room 708 can make use of another device, such as device 715, that has the requisite capability. In such case, a node manager 714 within a Virtual Machine (VM), seen as VM 716, can be resident on the device 715. The node manager 714 operating on the device 715 can communicate with browser 713 on device 711. This approach permits RPA system 700 to operate with devices that may have lower processing capability, such as older laptops, desktops, and portable/mobile devices such as tablets and mobile phones. In certain embodiments the browser 713 may take the form of a mobile application stored on the device 711. The control room 708 can establish a user session 718.2 for the user 712.2 while interacting with the control room 708 and the corresponding user session 718.2 operates as described above for user session 718.1 with user session manager 724 operating on device 710 as discussed above.

In certain embodiments, the user session manager 724 provides five functions. First is a health service 738 that maintains and provides a detailed logging of bot execution including monitoring memory and CPU usage by the bot and other parameters such as number of file handles employed. The bots 704 can employ the health service 738 as a resource to pass logging information to the control room 708. Execution of the bot is separately monitored by the user session manager 724 to track memory, CPU, and other system information. The second function provided by the user session manager 724 is a message queue 740 for exchange of data between bots executed within the same user session 718. The third function is a deployment service (also referred to as a deployment module) 742 that connects to the control room 708 to request execution of a requested bot 704. The deployment service 742 can also ensure that the environment is ready for bot execution, such as by making available dependent libraries. The fourth function is a bot launcher 744 which can read metadata associated with a requested bot 704 and launch an appropriate container and begin execution of the requested bot. The fifth function is a debugger service 746 that can be used to debug bot code.

The bot player 726 can execute, or play back, a sequence of instructions encoded in a bot. The sequence of instructions can, for example, be captured by way of a recorder when a human performs those actions, or alternatively the instructions are explicitly coded into the bot. These instructions enable the bot player 726, to perform the same actions as a human would do in their absence. In one implementation, the instructions can compose of a command (action) followed by set of parameters, for example: Open Browser is a command, and a URL would be the parameter for it to launch a web resource. Proxy service 728 can enable integration of external software or applications with the bot to provide specialized services. For example, an externally hosted artificial intelligence system could enable the bot to understand the meaning of a "sentence."

The user 712.1 can interact with node manager 714 via a conventional browser 713 which employs the node manager 714 to communicate with the control room 708. When the user 712.1 logs in from the client device 710 to the control room 708 for the first time, the user 712.1 can be prompted to download and install the node manager 714 on the device 710, if one is not already present. The node manager 714 can establish a web socket connection to the user session manager 724, deployed by the control room 708 that lets the user 712.1 subsequently create, edit, and deploy the bots 704.

Figure 8:
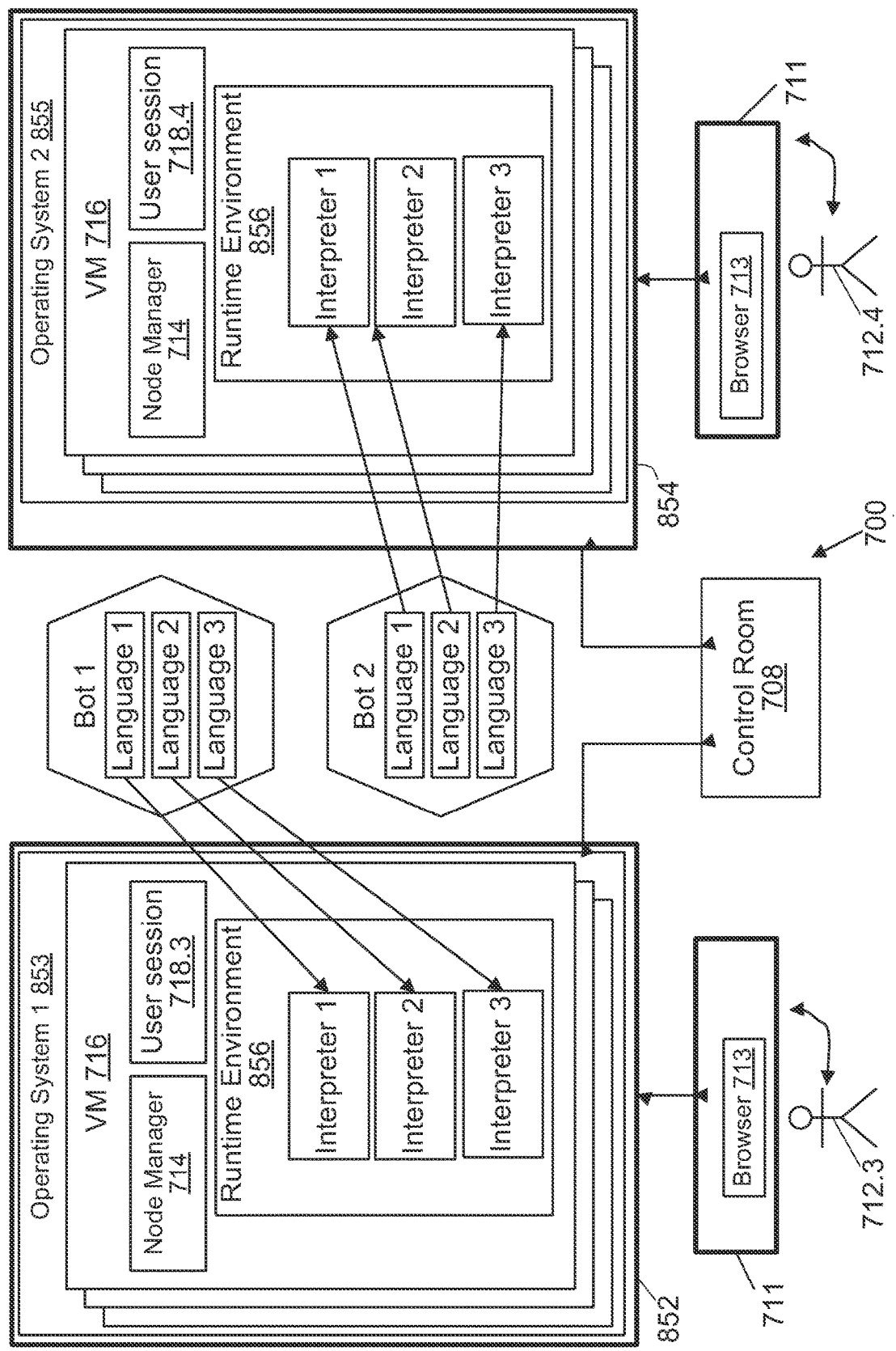
FIG. 8 is a block diagram of a generalized runtime environment for bots in accordance with another embodiment of the RPA system illustrated in FIG. 7.

FIG. 8 is a block diagram of a generalized runtime environment for bots 704 in accordance with another embodiment of the RPA system 700 illustrated in FIG. 7. This flexible runtime environment advantageously permits extensibility of the platform to enable use of various languages in encoding bots. In the embodiment of FIG. 8, RPA system 700 generally operates in the manner described in connection with FIG. 7, except that in the embodiment of FIG. 8, some or all of the user sessions 718 execute within a virtual machine 716. This permits the bots 704 to operate on an RPA system 700 that runs on an operating system different from an operating system on which a bot 704 may have been developed. For example, if a bot 704 is developed on the Windows® operating system, the platform agnostic embodiment shown in FIG. 8 permits the bot 704 to be executed on a device 852 or 854 executing an operating system 853 or 855 different than Windows®, such as, for example, Linux. In one embodiment, the VM 716 takes the form of a Java Virtual Machine (JVM) as provided by Oracle Corporation. As will be understood by those skilled in the art in view of the present disclosure, a JVM enables a computer to run Java® programs as well as programs written in other languages that are also compiled to Java® bytecode.

In the embodiment shown in FIG. 8, multiple devices 852 can execute operating system 1, 853, which may, for example, be a Windows® operating system. Multiple devices 854 can execute operating system 2, 855, which may, for example, be a Linux® operating system. For simplicity of explanation, two different operating systems are shown, by way of example and additional operating systems such as the macOS®, or other operating systems may also be employed on devices 852, 854 or other devices. Each device 852, 854 has installed therein one or more VM's 716, each of which can execute its own operating system (not shown), which may be the same or different than the host operating system 853/855. Each VM 716 has installed, either in advance, or on demand from control room 708, a node manager 714. The embodiment illustrated in FIG. 8 differs from the embodiment shown in FIG. 7 in that the devices 852 and 854 have installed thereon one or more VMs 716 as described above, with each VM 716 having an operating system installed that may or may not be compatible with an operating system required by an automation task. Moreover, each VM has installed thereon a runtime environment 856, each of which has installed thereon one or more interpreters (shown as interpreter 1, interpreter 2, interpreter 3). Three interpreters are shown by way of example but any run time environment 856 may, at any given time, have installed thereupon less than or more than three different interpreters. Each interpreter 856 is specifically encoded to interpret instructions encoded in a particular programming language. For example, interpreter 1 may be encoded to interpret software programs encoded in the Java® programming language, seen in FIG. 8 as language 1 in Bot 1 and Bot 2. Interpreter 2 may be encoded to interpret software programs encoded in the Python® programming language, seen in FIG. 8 as language 2 in Bot 1 and Bot 2, and interpreter 3 may be encoded to interpret software programs encoded in the R programming language, seen in FIG. 8 as language 3 in Bot 1 and Bot 2.

Turning to the bots Bot 1 and Bot 2, each bot may contain instructions encoded in one or more programming languages. In the example shown in FIG. 8, each bot can contain instructions in three different programming languages, for example, Java®, Python® and R. This is for purposes of explanation and the embodiment of FIG. 8 may be able to create and execute bots encoded in more or less than three programming languages. The VMs 716 and the runtime environments 856 permit execution of bots encoded in multiple languages, thereby permitting greater flexibility in encoding bots. Moreover, the VMs 716 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 708 will select a device with a VM 716 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 9:
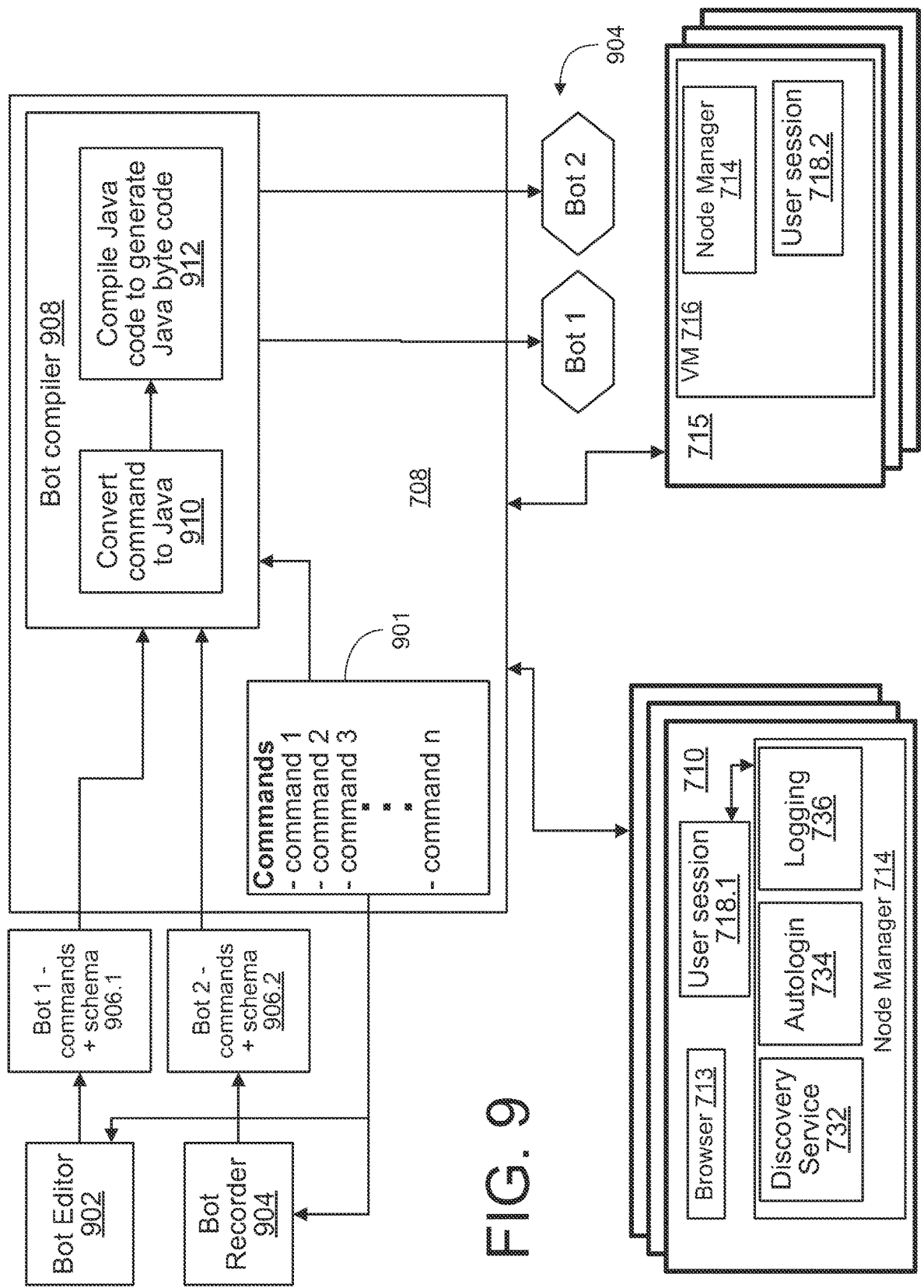
FIG. 9 illustrates a block diagram of yet another embodiment of the RPA system of FIG. 7 configured to provide platform independent sets of task processing instructions for bots.

FIG. 9 illustrates a block diagram of yet another embodiment of the RPA system 700 of FIG. 7 configured to provide platform independent sets of task processing instructions for bots 704. Two bots 704, bot 1 and bot 2 are shown in FIG. 9. Each of bots 1 and 2 are formed from one or more commands 901, each of which specifies a user level operation with a specified application program, or a user level operation provided by an operating system. Sets of commands 906.1 and 906.2 may be generated by bot editor 902 and bot recorder 904, respectively, to define sequences of application-level operations that are normally performed by a human user. The bot editor 902 may be configured to combine sequences of commands 901 via an editor. The bot recorder 904 may be configured to record application-level operations performed by a user and to convert the operations performed by the user to commands 901. The sets of commands 906.1 and 906.2 generated by the editor 902 and the recorder 904 can include command(s) and schema for the command(s), where the schema defines the format of the command(s). The format of a command can, such as, includes the input(s) expected by the command and their format. For example, a command to open a URL might include the URL, a user login, and a password to login to an application resident at the designated URL.

The control room 708 operates to compile, via compiler 908, the sets of commands generated by the editor 902 or the recorder 904 into platform independent executables, each of which is also referred to herein as a bot JAR (Java ARchive) that perform application-level operations captured by the bot editor 902 and the bot recorder 904. In the embodiment illustrated in FIG. 9, the set of commands 906, representing a bot file, can be captured in a JSON (JavaScript Object Notation) format which is a lightweight data-interchange text-based format. JSON is based on a subset of the JavaScript Programming Language Standard ECMA-262 3rd Edition—December 1999. JSON is built on two structures: (i) a collection of name/value pairs; in various languages, this is realized as an object, record, struct, dictionary, hash table, keyed list, or associative array, (ii) an ordered list of values which, in most languages, is realized as an array, vector, list, or sequence. Bots 1 and 2 may be executed on devices 710 and/or 715 to perform the encoded application-level operations that are normally performed by a human user.

Figure 10:
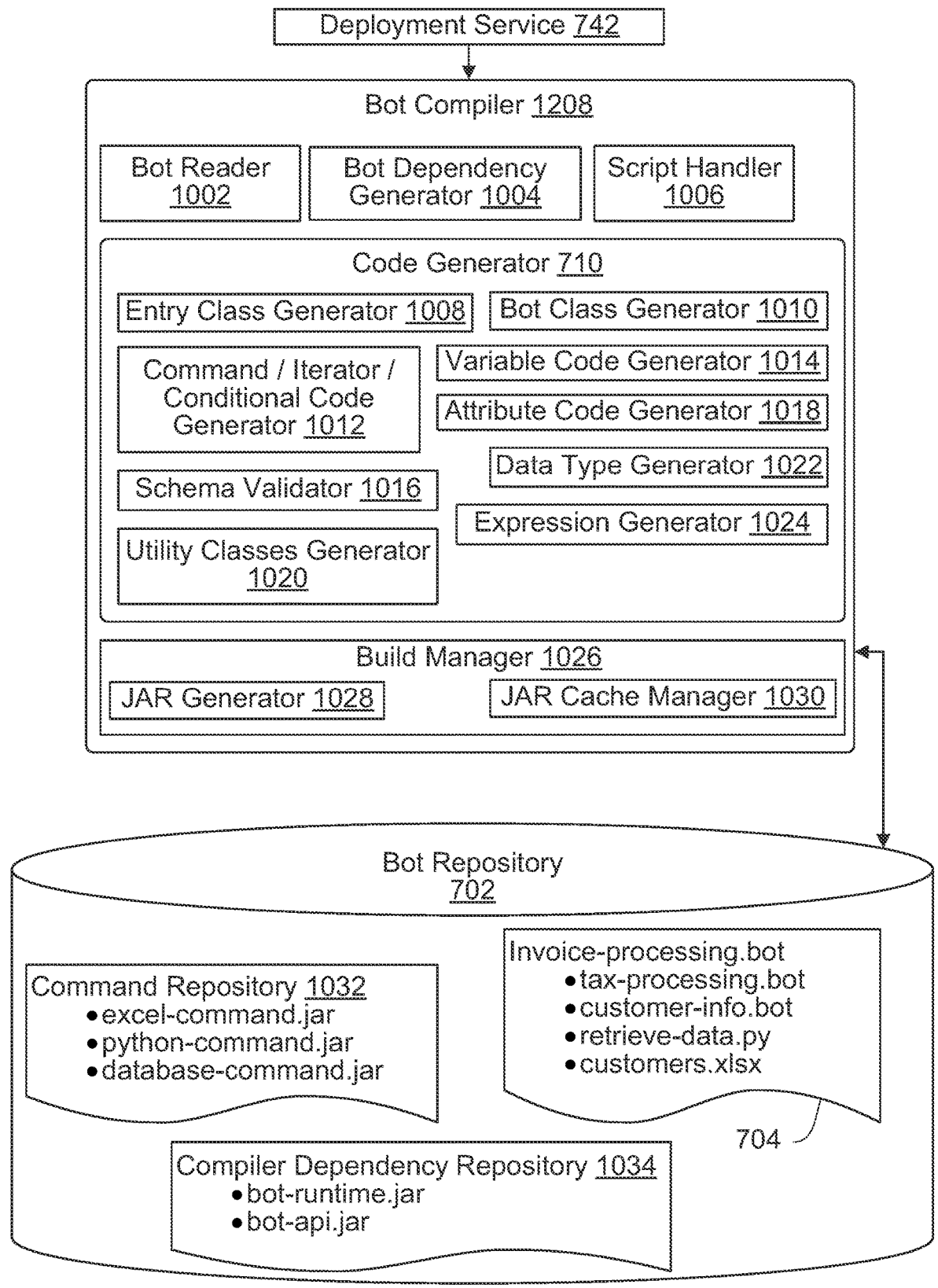
FIG. 10 is a block diagram illustrating details of one embodiment of the bot compiler illustrated in FIG. 9.

FIG. 10 is a block diagram illustrating details of one embodiment of the bot compiler 908 illustrated in FIG. 9. The bot compiler 908 accesses one or more of the bots 704 from the data storage 702, which can serve as bot repository, along with commands 901 that are contained in a command repository 1032. The bot compiler 708 can also access compiler dependency repository 1034. The bot compiler 708 can operate to convert each command 901 via code generator module 910 to an operating system independent format, such as a Java command. The bot compiler 708 then compiles each operating system independent format command into byte code, such as Java byte code, to create a bot JAR. The convert command to Java module 910 is shown in further detail in in FIG. 10 by JAR generator 1028 of a build manager 1026. The compiling to generate Java byte code module 912 can be provided by the JAR generator 1028. In one embodiment, a conventional Java compiler, such as javac from Oracle Corporation, may be employed to generate the bot JAR (artifacts). As will be appreciated by those skilled in the art, an artifact in a Java environment includes compiled code along with other dependencies and resources required by the compiled code. Such dependencies can include libraries specified in the code and other artifacts. Resources can include web pages, images, descriptor files, other files, directories and archives.

As noted in connection with FIG. 9, deployment service 742 can be responsible to trigger the process of bot compilation and then once a bot has compiled successfully, to execute the resulting bot JAR on selected devices 710 and/or

715. The bot compiler 908 can comprises a number of functional modules that, when combined, generate a bot 704 in a JAR format. A bot reader 1002 loads a bot file into memory with class representation. The bot reader 1002 takes as input a bot file and generates an in-memory bot structure. A bot dependency generator 1004 identifies and creates a dependency graph for a given bot. It includes any child bot, resource file like script, and document or image used while creating a bot. The bot dependency generator 1004 takes, as input, the output of the bot reader 1002 and provides, as output, a list of direct and transitive bot dependencies. A script handler 1006 handles script execution by injecting a contract into a user script file. The script handler 1006 registers an external script in manifest and bundles the script as a resource in an output JAR. The script handler 1006 takes, as input, the output of the bot reader 1002 and provides, as output, a list of function pointers to execute different types of identified scripts like Python, Java, VB scripts.

An entry class generator 1008 can create a Java class with an entry method, to permit bot execution to be started from that point. For example, the entry class generator 1008 takes, as an input, a parent bot name, such "Invoice-processing-.bot" and generates a Java class having a contract method with a predefined signature. A bot class generator 1010 can generate a bot class and orders command code in sequence of execution. The bot class generator 1010 can take, as input, an in-memory bot structure and generates, as output, a Java class in a predefined structure. A Command/Iterator/Conditional Code Generator 1012 wires up a command class with singleton object creation, manages nested command linking, iterator (loop) generation, and conditional (If/Else If/Else) construct generation. The Command/Iterator/Conditional Code Generator 1012 can take, as input, an in-memory bot structure in JSON format and generates Java code within the bot class. A variable code generator 1014 generates code for user defined variables in the bot, maps bot level data types to Java language compatible types, and assigns initial values provided by user. The variable code generator 1014 takes, as input, an in-memory bot structure and generates Java code within the bot class. A schema validator 1016 can validate user inputs based on command schema and includes syntax and semantic checks on user provided values. The schema validator 1016 can take, as input, an in-memory bot structure and generates validation errors that it detects. The attribute code generator 1018 can generate attribute code, handles the nested nature of attributes, and transforms bot value types to Java language compatible types. The attribute code generator 1018 takes, as input, an in-memory bot structure and generates Java code within the bot class. A utility classes generator 1020 can generate utility classes which are used by an entry class or bot class methods. The utility classes generator 1020 can generate, as output, Java classes. A data type generator 1022 can generate value types useful at runtime. The data type generator 1022 can generate, as output, Java classes. An expression generator 1024 can evaluate user inputs and generates compatible Java code, identifies complex variable mixed user inputs, inject variable values, and transform mathematical expressions. The expression generator 1024 can take, as input, user defined values and generates, as output, Java compatible expressions.

The JAR generator 1028 can compile Java source files, produces byte code and packs everything in a single JAR, including other child bots and file dependencies. The JAR generator 1028 can take, as input, generated Java files, resource files used during the bot creation, bot compiler dependencies, and command packages, and then can generate a JAR artifact as an output. The JAR cache manager 1030 can put a bot JAR in cache repository so that recompilation can be avoided if the bot has not been modified since the last cache entry. The JAR cache manager 1030 can take, as input, a bot JAR.

In one or more embodiment described herein command action logic can be implemented by commands 901 available at the control room 708. This permits the execution environment on a device 710 and/or 715, such as exists in a user session 718, to be agnostic to changes in the command action logic implemented by a bot 704. In other words, the manner in which a command implemented by a bot 704 operates need not be visible to the execution environment in which a bot 704 operates. The execution environment is able to be independent of the command action logic of any commands implemented by bots 704. The result is that changes in any commands 901 supported by the RPA system 700, or addition of new commands 901 to the RPA system 700, do not require an update of the execution environment on devices 710, 715. This avoids what can be a time and resource intensive process in which addition of a new command 901 or change to any command 901 requires an update to the execution environment to each device 710, 715 employed in a RPA system. Take, for example, a bot that employs a command 901 that logs into an on-online service. The command 901 upon execution takes a Uniform Resource Locator (URL), opens (or selects) a browser, retrieves credentials corresponding to a user on behalf of whom the bot is logging in as, and enters the user credentials (e.g., username and password) as specified. If the command 901 is changed, for example, to perform two-factor authentication, then it will require an additional resource (the second factor for authentication) and will perform additional actions beyond those performed by the original command (for example, logging into an email account to retrieve the second factor and entering the second factor). The command action logic will have changed as the bot is required to perform the additional changes. Any bot(s) that employ the changed command will need to be recompiled to generate a new bot JAR for each changed bot and the new bot JAR will need to be provided to a bot runner upon request by the bot runner. The execution environment on the device that is requesting the updated bot will not need to be updated as the command action logic of the changed command is reflected in the new bot JAR containing the byte code to be executed by the execution environment.

The embodiments herein can be implemented in the general context of computer-executable instructions, such as those included in program modules, being executed in a computing system on a target, real or virtual, processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may further include a device or product having content stored thereon at a time of sale or delivery. Thus, delivering a device with stored content, or offering content for download over a communication medium, may be understood as providing an article of manufacture with such content described herein.

Figure 11:
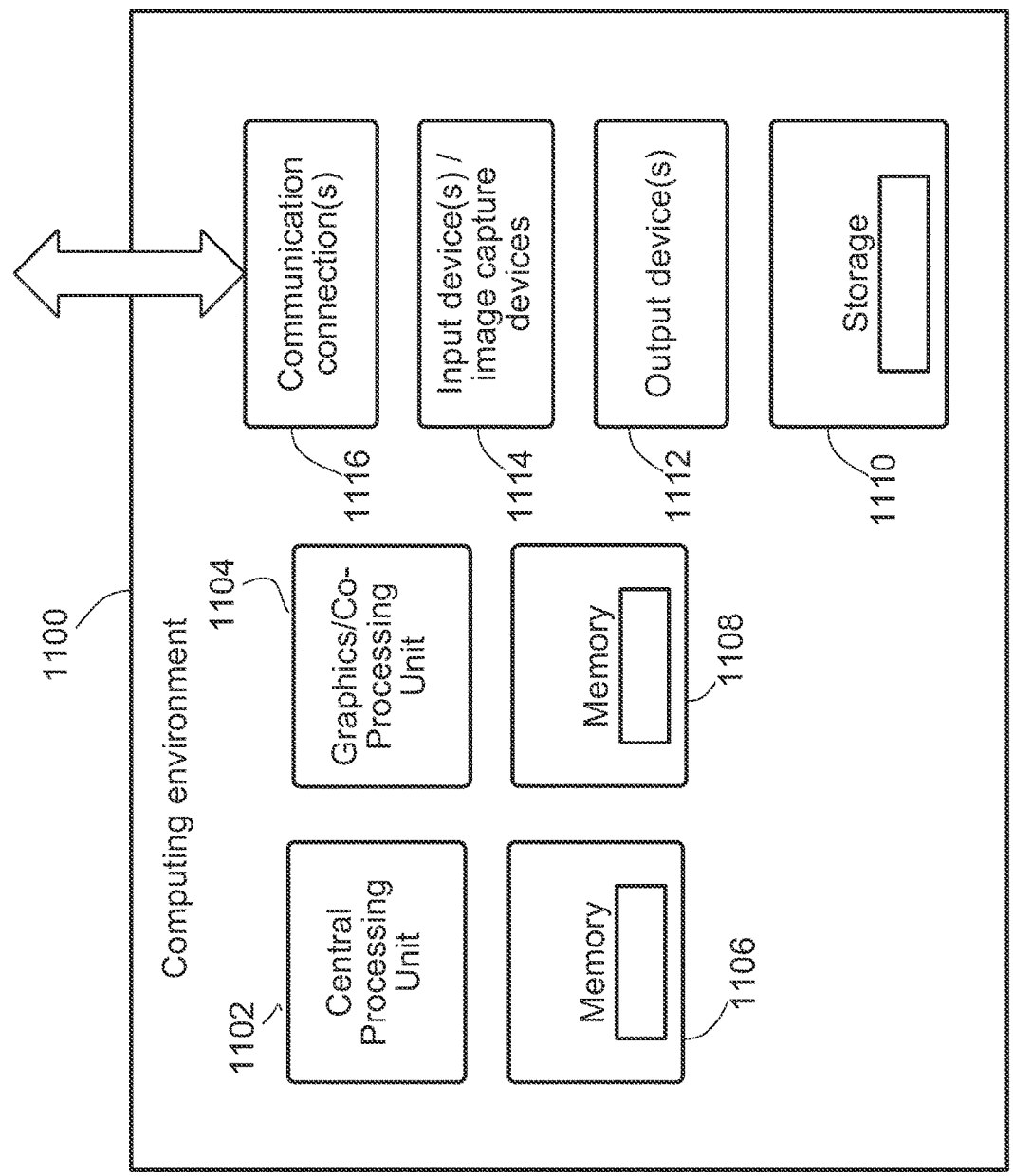
FIG. 11 illustrates a block diagram of an exemplary computing environment for an implementation of an RPA system, such as the RPA systems disclosed herein.

FIG. 11 illustrates a block diagram of an exemplary computing environment 1100 for an implementation of an RPA system, such as the RPA systems disclosed herein. The embodiments described herein may be implemented using the exemplary computing environment 1100. The exemplary computing environment 1100 includes one or more processing units 1102, 1104 and memory 1106, 1108. The processing units 1102, 1106 execute computer-executable instructions. Each of the processing units 1102, 1106 can be a general-purpose central processing unit (CPU), processor in an application-specific integrated circuit (ASIC) or any other type of processor. For example, as shown in FIG. 11, the processing unit 1102 can be a CPU, and the processing unit can be a graphics/co-processing unit (GPU). The tangible memory 1106, 1108 may be volatile memory (e.g., registers, cache, RAM), non-volatile memory (e.g., ROM, EEPROM, flash memory, etc.), or some combination of the two, accessible by the processing unit(s). The hardware components may be standard hardware components, or alternatively, some embodiments may employ specialized hardware components to further increase the operating efficiency and speed with which the RPA system operates. The various components of exemplary computing environment 1100 may be rearranged in various embodiments, and some embodiments may not require nor include all of the above components, while other embodiments may include additional components, such as specialized processors and additional memory.

The exemplary computing environment 1100 may have additional features such as, for example, tangible storage 1110, one or more input devices 1114, one or more output devices 1112, and one or more communication connections 1116. An interconnection mechanism (not shown) such as a bus, controller, or network can interconnect the various components of the exemplary computing environment 1100. Typically, operating system software (not shown) provides an operating system for other software executing in the exemplary computing environment 1100, and coordinates activities of the various components of the exemplary computing environment 1100.

The tangible storage 1110 may be removable or non-removable, and includes magnetic disks, magnetic tapes or cassettes, CD-ROMs, DVDs, or any other medium which can be used to store information in a non-transitory way, and which can be accessed within the computing system 1100. The tangible storage 1110 can store instructions for the software implementing one or more features of a PRA system as described herein.

The input device(s) or image capture device(s) 1114 may include, for example, one or more of a touch input device (such as a keyboard, mouse, pen, or trackball), a voice input device, a scanning device, an imaging sensor, touch surface, or any other device capable of providing input to the exemplary computing environment 1100. For multimedia embodiment, the input device(s) 1114 can, for example, include a camera, a video card, a TV tuner card, or similar device that accepts video input in analog or digital form, a microphone, an audio card, or a CD-ROM or CD-RW that reads audio/video samples into the exemplary computing environment 1100. The output device(s) 1112 can, for example, include a display, a printer, a speaker, a CD-writer, or any another device that provides output from the exemplary computing environment 1100.

The one or more communication connections 1116 can enable communication over a communication medium to another computing entity. The communication medium conveys information such as computer-executable instructions, audio or video input or output, or other data. The communication medium can include a wireless medium, a wired medium, or a combination thereof.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of authenticating a service request to a cloud-based service of at least one service provider, the method comprising:

receiving a remote authentication request, the remote authentication request including at least a user identifier corresponding to a user;

extracting the user identifier from the remote authentication request;

determining whether the user identifier is valid;

retrieving an encrypted access identifier corresponding to the user identifier, provided that the determining has determined that the user identifier is valid;

forming an authentication token request, the authentication token request including at least the encrypted access identifier;

sending the authentication token request to a gateway proxy providing a gateway to the cloud-based service of the at least one service provider;

subsequently receiving an authentication token from the gateway proxy; and returning the authentication token received from the gateway proxy in response to the remote authentication request, wherein the service request is from a local processing agent, and wherein the local processing agent is a software automation process supported by a robotic processing automation system, the robotic processing automation system supporting a plurality of software automation processes.

2. A method as recited in claim 1, wherein the method comprises:

subsequently making the service request to the at least one service provider, the service request including at least the authentication token from the gateway proxy.

3. A method as recited in claim 1, wherein the service request is from the local processing agent to the at least one service provider via the gateway proxy.

4. A method as recited in claim 3, wherein the local processing agent at least issues a service request to the cloud-based service of the at least one service provider is an automated manner without user input.

5. A method as recited in claim 3, wherein the returning the authentication token in response to the remote authentication request returns the authentication token to the local processing agent.

6. A method as recited in claim 3, wherein the method comprises:

sending a request to a gateway proxy for access to the cloud-based service of the at least one service provider, the request including the authentication token;

authenticating, at the gateway proxy, that the local processing agent is authorized to access the cloud-based service of the at least one service provider, the authenticating being at least based on the authentication token;

acquiring, at the gateway proxy, an authentication credential if the authenticating has determined that the local processing agent is authorized to access the cloud-based service of the at least one service provider;

providing, to the cloud-based service of the at least one service provider, a service request and the authentication credential; and receiving, from the cloud-based service of the at least one service provider, a response to the service request.

7. A method as recited in claim 6, wherein the authentication token is valid for a limited time period.

8. A method as recited in claim 6, wherein the service request is from a local processing agent to the at least one service provider via the gateway proxy.

9. A method as recited in claim 1, wherein the retrieving of the encrypted access identifier comprises:

determining whether the encrypted access identifier is stored in a cache memory; and retrieving the encrypted access identifier from the cache memory if the determining whether the encrypted access identifier is stored in the cache memory has determined that the encrypted access identifier is stored in the cache memory.

10. A method as recited in claim 9, wherein the retrieving of the encrypted access identifier comprises:

retrieving the encrypted access identifier from an access management system if the determining whether the encrypted access identifier is stored in the cache memory has determined that the encrypted access identifier is not stored in the cache memory.

11. A method as recited in claim 1, wherein the retrieving of the encrypted access identifier retrieves the encrypted access identifier from an access management system.

12. A non-transitory computer readable medium including at least computer program code tangible stored thereon for authenticating a service request to a cloud-based service of at least one service provider, the computer readable medium comprising:

computer program code for receiving a remote authentication request, the remote authentication request including at least an initial identifier corresponding to a user;

computer program code for extracting the initial identifier from the remote authentication request;

computer program code for determining whether the initial identifier is valid;

computer program code for retrieving an encrypted access identifier corresponding to the initial identifier, provided that the computer program code for determining has determined that the initial identifier is valid;

computer program code for forming an authentication token request, the authentication token request including at least the encrypted access identifier;

computer program code for sending the authentication token request to a gateway proxy providing a gateway to the cloud-based service of the at least one service provider;

computer program code for subsequently receiving an authentication token from the gateway proxy; and computer program code for returning the authentication token received from the gateway proxy in response to the remote authentication request, wherein the service request is from a local processing agent, and wherein the local processing agent is a software automation process supported by a robotic processing automation system, the robotic processing automation system supporting a plurality of software automation processes.

13. A non-transitory computer readable medium as recited in claim 12, wherein the non-transitory computer readable medium comprises:

computer program code for subsequently making the service request to the at least one service provider, the service request including at least the authentication token from the gateway proxy.

14. A non-transitory computer readable medium as recited in claim 12, wherein the service request is from the local processing agent to the at least one service provider via the gateway proxy.

15. A non-transitory computer readable medium as recited in claim 14, wherein the local processing agent at least issues a service request to the cloud-based service of the at least one service provider is an automated manner without user input.

16. A non-transitory computer readable medium as recited in claim 14, wherein the computer program code for returning the authentication token in response to the remote authentication request returns the authentication token to the local processing agent.

17. A non-transitory computer readable medium as recited in claim 14, wherein the non-transitory computer readable medium comprises:
   computer program code for sending a request to a gateway proxy for access to the cloud-based service of the at least one service provider, the request including the authentication token;
   computer program code for authenticating, at the gateway proxy, that the local processing agent is authorized to access the cloud-based service of the at least one service provider, the authenticating being at least based on the authentication token;
   computer program code for acquiring, at the gateway proxy, an authentication credential if the computer program code for authenticating has determined that the local processing agent is authorized to access the cloud-based service of the at least one service provider;
   computer program code for providing, to the cloud-based service of the at least one service provider, a service request and the authentication credential; and
   computer program code for receiving, from the cloud-based service of the at least one service provider, a response to the service request.

18. A non-transitory computer readable medium as recited in claim 17, wherein the authentication token is valid for a limited time period.

19. A non-transitory computer readable medium as recited in claim 17, wherein the service request is from a local processing agent to the at least one service provider via the gateway proxy.

20. A non-transitory computer readable medium as recited in claim 14, wherein the computer program code for retrieving of the encrypted access identifier comprises:
   computer program code for determining whether the encrypted access identifier is stored in a cache memory; and
   computer program code for retrieving the encrypted access identifier from the cache memory if the computer program code for determining whether the encrypted access identifier is stored in the cache memory has determined that the encrypted access identifier is stored in the cache memory.

21. A non-transitory computer readable medium as recited in claim 20, wherein the computer program code for retrieving of the encrypted access identifier comprises:
   computer program code for retrieving the encrypted access identifier from an access management system if the computer program code for determining whether the encrypted access identifier is stored in the cache memory has determined that the encrypted access identifier is not stored in the cache memory.

22. A non-transitory computer readable medium as recited in claim 14, wherein the computer program code for retrieving of the encrypted access identifier retrieves the encrypted access identifier from an access management system.

23. A robotic process automation (RPA) system, comprising:
   a data store configured to store a plurality of software processing agents, each of the software processing agents pertaining to a series of user-initiated events with one or more software programs operating on one or more computing devices;
   a software processing agent management system configures to control usage of the software processing agents for operation;
   a gateway proxy for controlling access to a cloud-based service available from a service provider, the gateway proxy including at least:
      an access management module that manages operation of the gateway proxy, including evaluating whether the p articular software processing agent is authorized;
      an access identifier validator configured to validate an access identifier being provided to the gateway proxy in a service request; and
      an authorization token generator configured to generate an authorization token for use by the particular software processing agent; and
   a software processing agent authorization system configured to receive authorization request from a particular software processing agent of the software processing agents, and to authenticate the authorization request with the RPA system, and to authenticate the particular software processing agent with the gateway proxy for access to the cloud-based service available from the service provider,
   wherein the software processing agent authorization system comprises:
      a user identifier validator configured to validate a user identifier provided by the p articular local processing agent; and
      an access identifier storage configured to store access identifiers, the access identifiers being encrypted access identifiers,
   wherein the gateway proxy comprises a service request modifier configured to receive a service request from the particular software processing agent, the service request including at least a submitted authorization token,
   wherein the gateway proxy determines whether the submitted authorization token is valid, and
   wherein the access management module retrieves appropriate access credentials and causes the service request modifier to modify the service request to include the appropriate access credentials.

24. A robotic process automation system as recited in claim 23, wherein the access identifiers are valid only for a limited period of time.

\* \* \* \* \*